United States Patent [19]

Biewer

[11] 3,771,132

[45] Nov. 6, 1973

[54] DATA COLLECTION SYSTEM INCLUDING CONTROLLED POWER SWITCHING OF THE DATA COLLECTION MODULES THEREOF

[75] Inventor: Mathias L. Biewer, Claremont, Calif.

[73] Assignee: MSI Data Corporation, Montclair, Calif.

[22] Filed: Apr. 19, 1971

[21] Appl. No.: 135,345

[52] U.S. Cl. .............................................. 340/172.5

[51] Int. Cl. .............................................. G06f 3/02

[58] Field of Search .......................... 340/172.5, 365; 346/74 M

[56] References Cited

UNITED STATES PATENTS

| | | | |
|---|---|---|---|
| 3,401,396 | 9/1968 | Wolf et al. | 346/74 M |
| 3,550,151 | 12/1970 | Fuller, Jr. | 346/74 M |
| 3,594,734 | 7/1971 | Wang et al | 340/172.5 |
| 3,103,401 | 9/1963 | Daniels et al. | 346/74 M X |
| 3,195,139 | 7/1965 | Hood, Jr. | 346/74 M X |
| 3,413,624 | 11/1968 | Murdoch et al | 346/74 M X |
| 3,422,441 | 1/1969 | Chapsky | 346/74 M |
| 3,541,526 | 11/1970 | Levy et al. | 340/172.5 |
| 3,576,433 | 4/1971 | Lee et al | 340/172.5 X |
| 3,303,471 | 2/1967 | Duncan et al. | 340/172.5 |
| 3,303,472 | 2/1967 | Chalker, Jr. et al. | 340/172.5 |
| 3,491,355 | 1/1970 | Harrold | 340/365 |
| 3,512,139 | 5/1970 | Reynolds, Jr. et al. | 340/172.5 |

*Primary Examiner*—Paul J. Henon
*Assistant Examiner*—Melvin B. Chapnick
*Attorney*—Christie, Parker & Hale

[57] ABSTRACT

A data collection system for collecting data, electronically encoding it and processing it to allow it to be transmitted to a distant point. The system is defined in terms of a plurality of modules for collecting and processing data and which modules may be controlled and powered from a central modular control element. One of the modules for the system includes manually operated keyboard means for collecting data and electronically entering it into the system. The keyboard module includes a data register for receiving and storing the data entered into the system by means of the keyboard and a local timing signal source that is activated in response to the operation of a key. This module timing signal is coupled by means of a system bus to the control module for activating a control clock pulse source that couples clock pulses onto the system bus that are applied to the keyboard data register along with the data register for the other modules of the system for transferring the data from the keyboard module to the other modules of the system. The other modules may include a magnetic recording module having an individual data register and means for processing any data entered into the register for transmission to a remote point. The system may also include a display means for rendering visible the data entered into the system. The display means may comprise a printer also having a data register responsive to the central clock pulses for receiving data from the keyboard module. The system may be powered from a central power source such as a battery. For this purpose, the modules may include a power switch that is coupled to be responsive to the keyboard timing signal for applying the power to these modules for the duration of the timing signal.

34 Claims, 19 Drawing Figures

INVENTOR.
MATHIAS L. BIEWER
BY
Christie, Parker & Hale
ATTORNEYS

PATENTED NOV 6 1973 3,771,132

SHEET 11 OF 17

TIMING DIAGRAM, ID

DATA COLLECTION SYSTEM INCLUDING CONTROLLED POWER SWITCHING OF THE DATA COLLECTION MODULES THEREOF

This invention relates to a data collection system and more particularly to a data collection system for collecting information, encoding it, recording it, and for then conditioning it so that it may be transmitted to a distant location by means of the telephone lines or the like for computer processing.

PRIOR ART

At the present time there has been developed and there is in use various types of data collection or acquisition systems for accumulating and recording various types of data. The data so collected is generally transmitted by any conventional means to a central computer processor for further processing. Data may be transmitted thereto from various data collection stations. One such data collection system that is presently in use is a system for ordering items for supermarkets, drug stores and other large volume retailers from a central warehouse. These data collection systems developed to date generally employ modified adding machines as an input device for collecting the data relative to the items on the retailer's shelves that need to be replenished. One such electronic ordering system is described in the copending patent application bearing Ser. No. 724,973 entitled Data Entry Verification System, now U.S. Pat. No. 3,576,433 and which application is assigned to the same assignee as the present invention. Although these systems have been commercially successful, there is still a need for a portable and simplified data collection system.

DISCLOSURE OF THE INVENTION

The present invention is an improved data collection system that incorporates a portable data terminal that is small, lightweight and may be self-powered. The data terminal is defined so that various data collection modules may be coupled to the terminal to afford various data collection modes. The basic data collection system includes a simplified, hand-held data entry device, or keyboard, the gathering data, entering it into the system and recording it on a magnetic medium such as a "cassette" type magnetic tape cartridge. The data collection system may also include means for displaying the gathered information. This means may be a printer for printing out information as it is recorded on the magnetic medium. An important aspect of the data collection system of the present invention is the electrical powering of the various elements or modules comprising the system from a central power source which may be a lightweight battery. The elements comprising the data collection system are all readily coupled to one another by means of a central bus system for transferring signals between the system modules. When the system utilizes a central power source, the powering of the modules is made dependent on the actuation of one of the modules which acts as the data source and switches power into the other activated modules of the system to allow the data generated, or the data stored in the data source, to be transferred to other elements of the system. The power system is so controlled that the activation or powering of a particular module is for a preselected time interval of duration selected to allow the data transfer operation to be completed and the module to then be decoupled from the power source thereafter. The data that has been derived from the data source and transferred to a particular module of the system, will be operated on and powered under the control of the particular module. The improved power system provides economy of the energy stored in the power source and an over-all reduction in size is realized in the implementation of the modular concept for the data collection system.

From a broad structural standpoint, the present invention comprehends a data collection system comprising a data transmitting element which may be considered a data source, means for actuating the source for providing signals therefrom and a local timing signal source coupled to be responsive to the actuation of the data source for providing timing signals having a preselected time duration. A system control element having a central timing signal source for providing timing signals to the various elements of modules of the data collection system is coupled to be responsive to the local timing signals from the data transmitting element or module for providing the central timing signals for a preselected time duration to allow the data to be transferred from a data transmitting element to a data receiving element. The data receiving element may have a data register coupled to receive the data signals transferred out of the data register for the data transmitting element in response to the central timing signals. With the passage of the preselected time duration selected for the local timing signal source the data transmitting element will be decoupled and the data receiving element will control itself to allow the data now stored in its data register to be further processed in accordance with the desired end result. This further processing may include the transfer of the data from the individual data register to a magnetic storage medium, display means and/or a printer for rendering the data usable for transmission and visible to the system operator.

From a more specific standpoint, the data collection system comprises a manually operated lightweight keyboard comprising a plurality of keys adapted for electrically generating data signals. The key closures are electronically coded for providing binary coded signals representative of the data being collected and entered into the system by the operator. The data that is generated by the operation of the key is coded in terms of a preselected code and stored in a local data register. The operation of a key also actuates a local timing signal source providing timing signals of a preselected time duration. The local timing or strobe signal is coupled to the other elements or modules of the system that are operative therewith by applying it to a power switch for these various elements for coupling the central power source to the remaining elements to allow the transfer of the data from the local data register to the other active data registers for the other modules of the system. The local or strobe timing signal is also effective for triggering a central timing signal source that is applied to the various other active modules of the system to effect the desired data transfer. The central timing signals are effective during the active period of the local timing signal to transfer the generated data from a local data register to one of the other active data registers. The central timing signals are counted at the data transmitter and at a preselected count terminates the strobe signal for decoupling the power from the system. At this time, then all of the data will have been transferred from the keyboard data register to one or more of the other data registers of the system for a receiving element and will be locally "logically" controlled for applying power to the receiving element to allow the transferred data to be further processed. The data may be recorded on a magnetic tape media for transmission to a remote point or may be stored thereon and be utilized as a local data source for further transfer to another of the elements of the data collection system in accordance with the desired end results.

These and other features of the present invention may be more fully appreciated when considered in the light of the following specificaton and drawings, in which.

Figure 9:
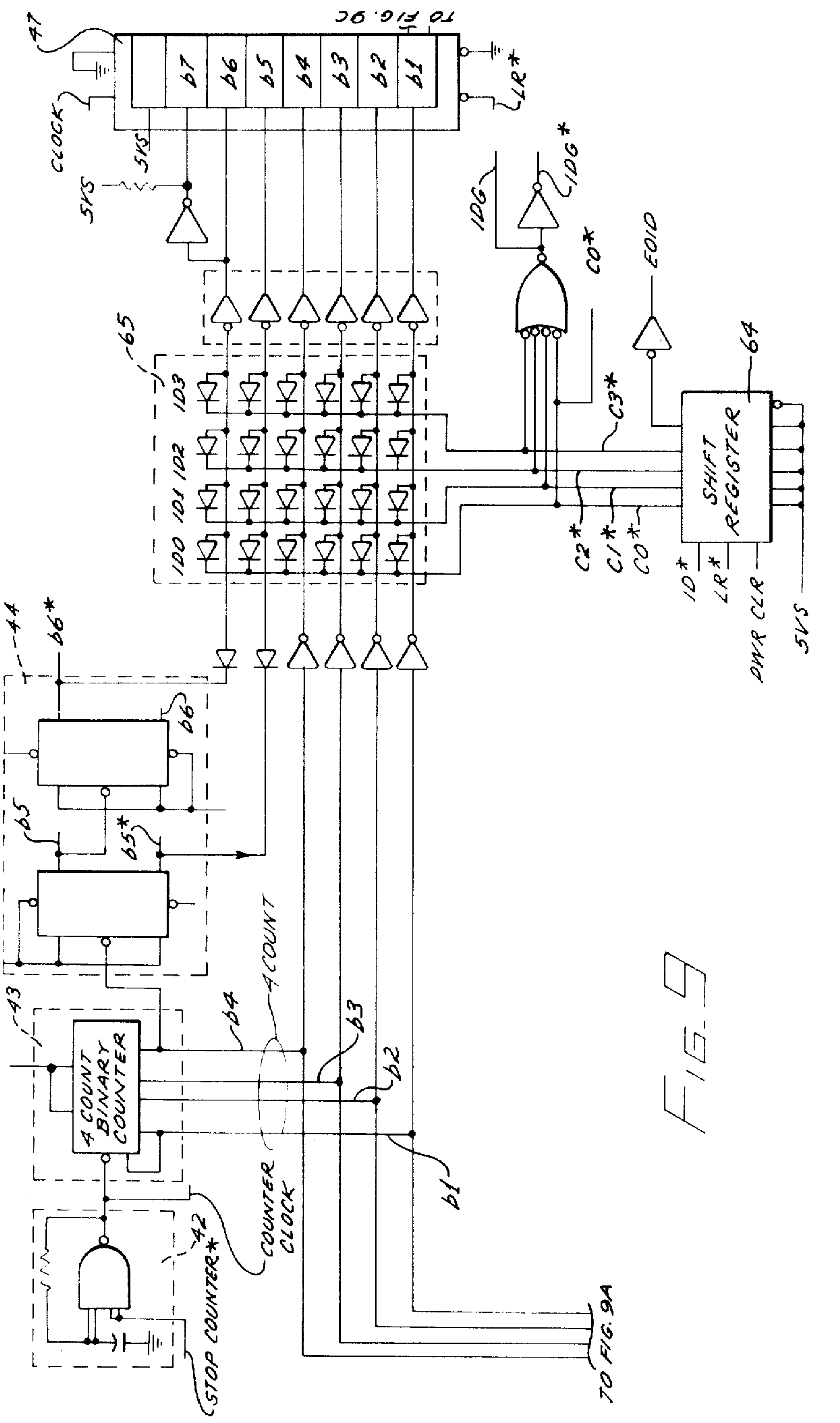
Figure 9A:
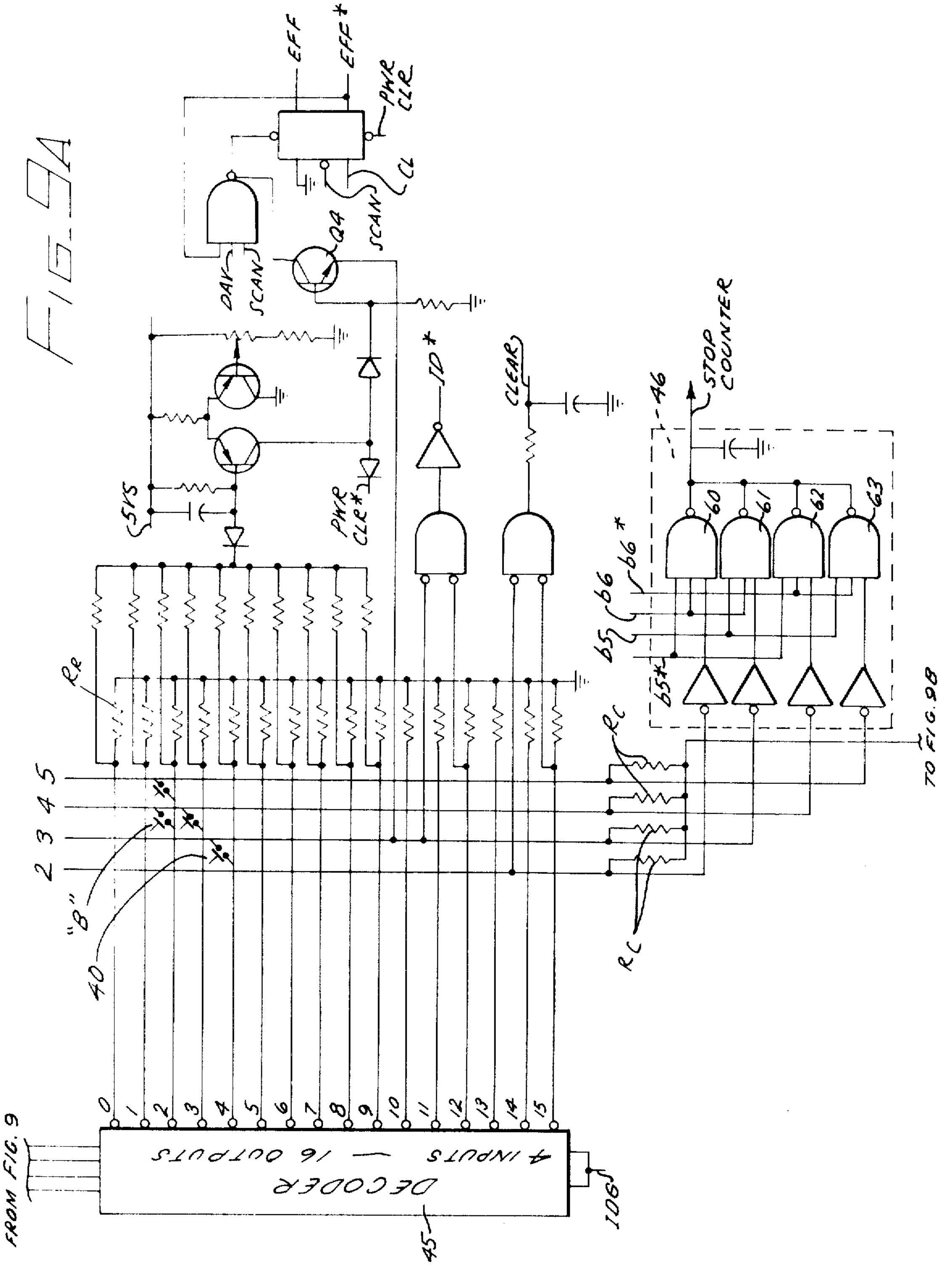
Figure 9B:
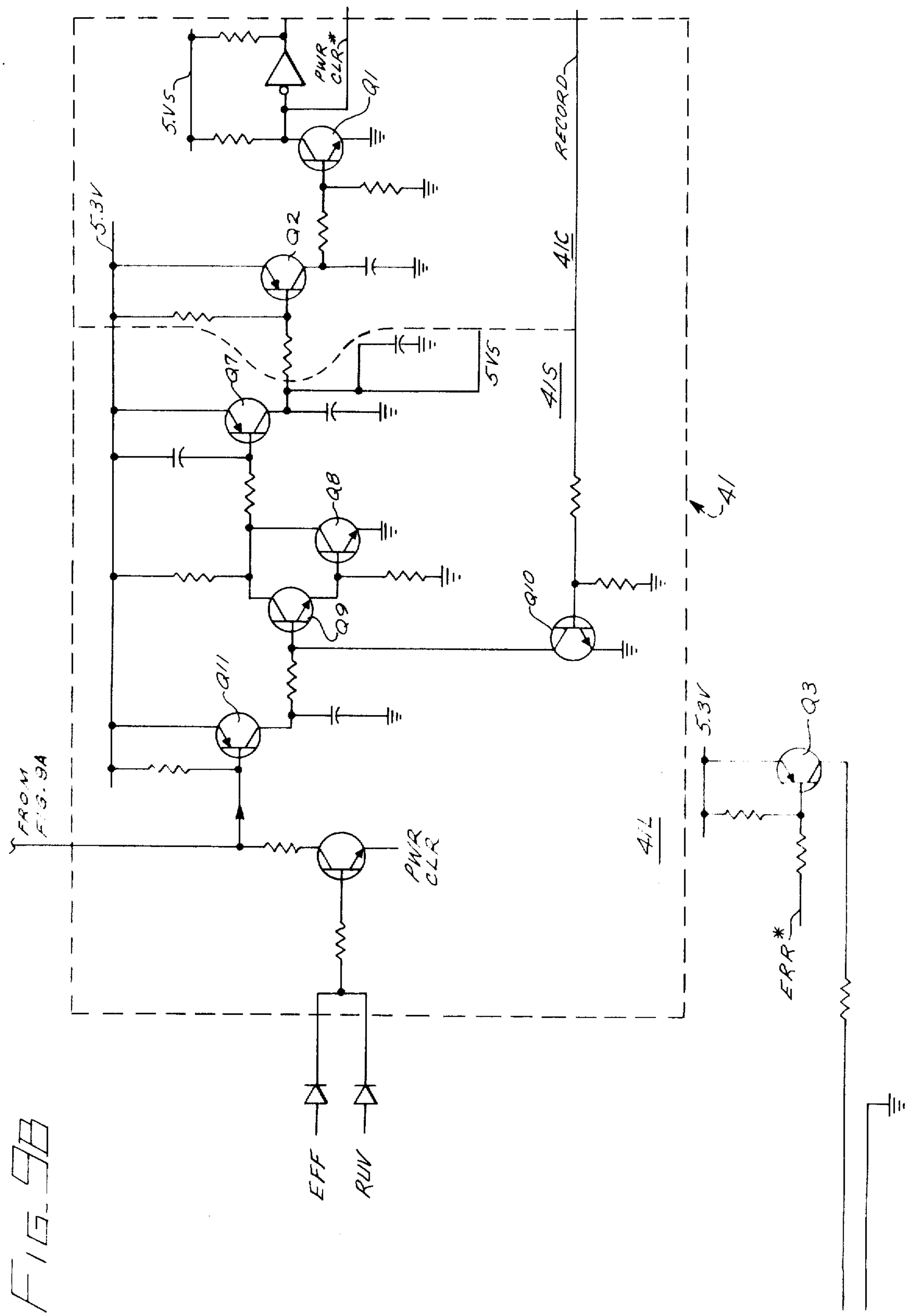
Figure 9C:
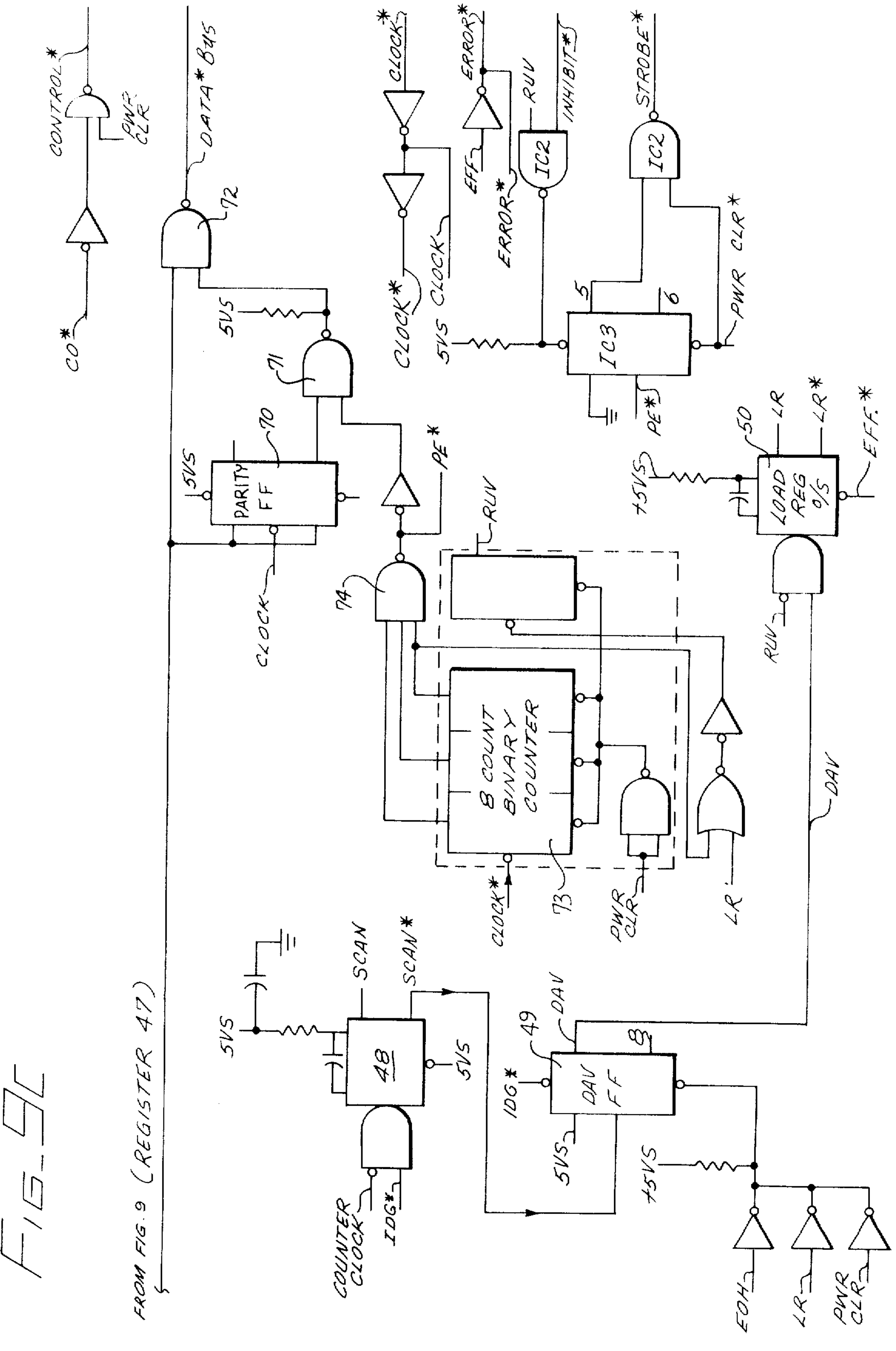
Figure 9D:
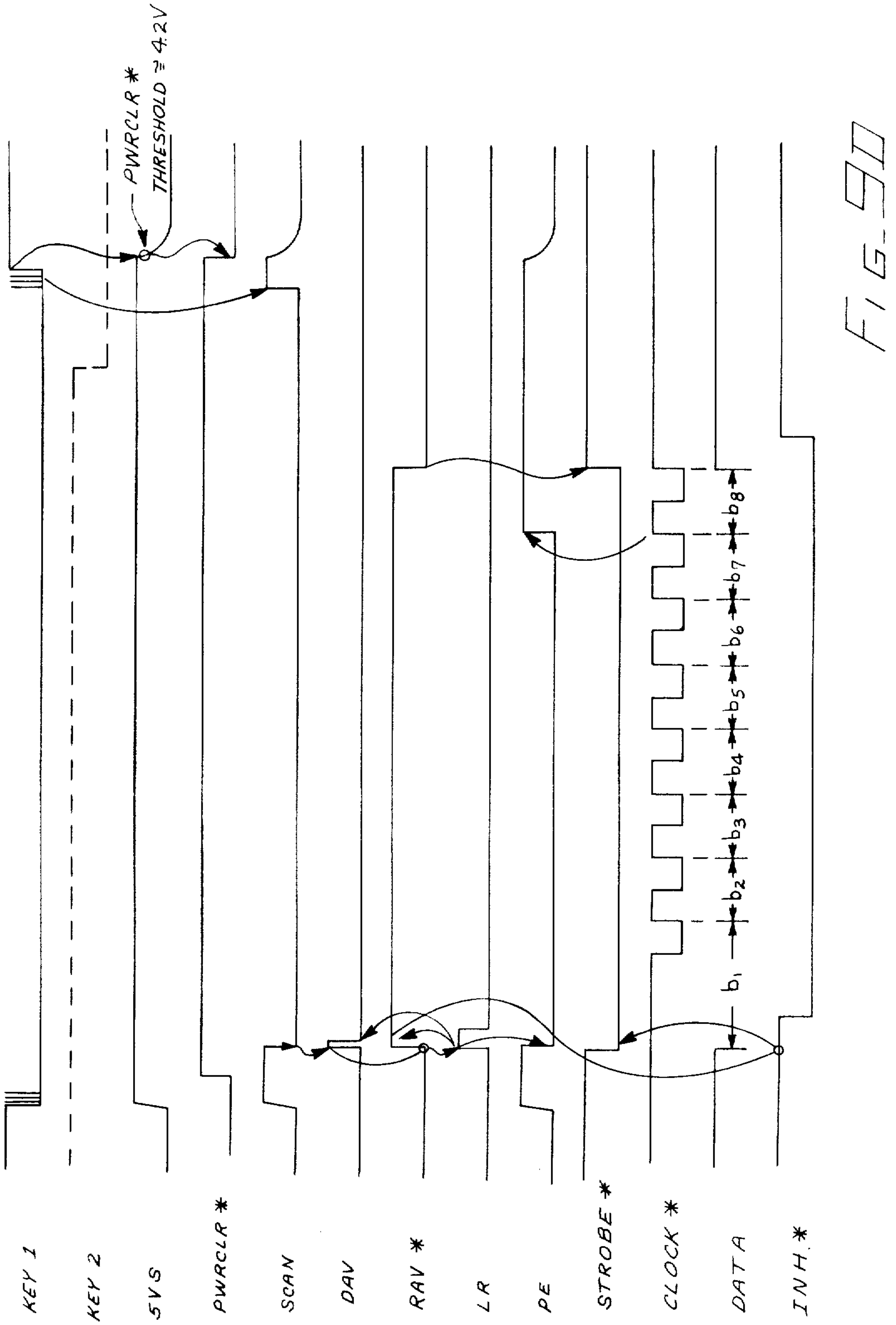
Figure 9E:
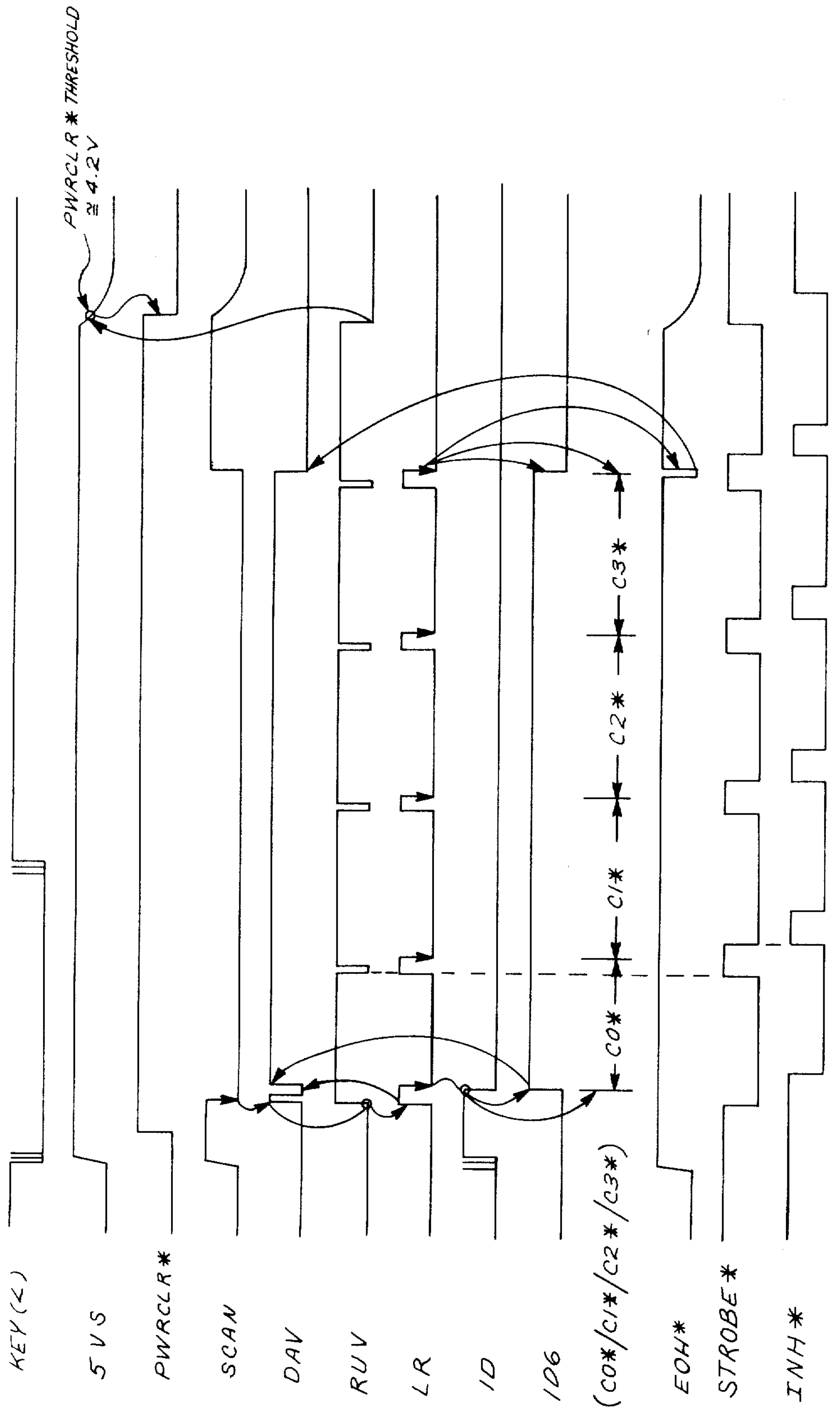
Figure 10:
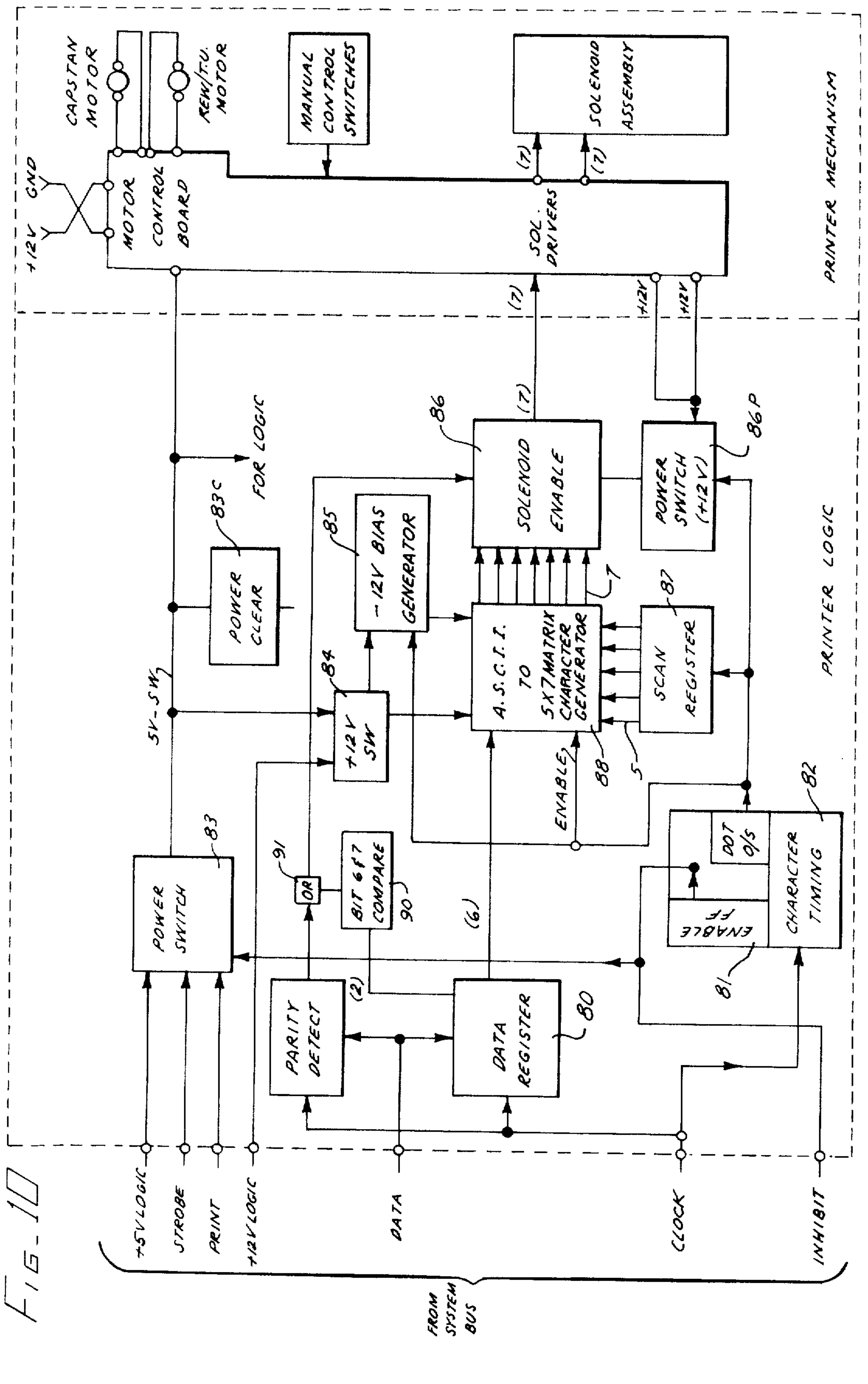
Figure 10A:
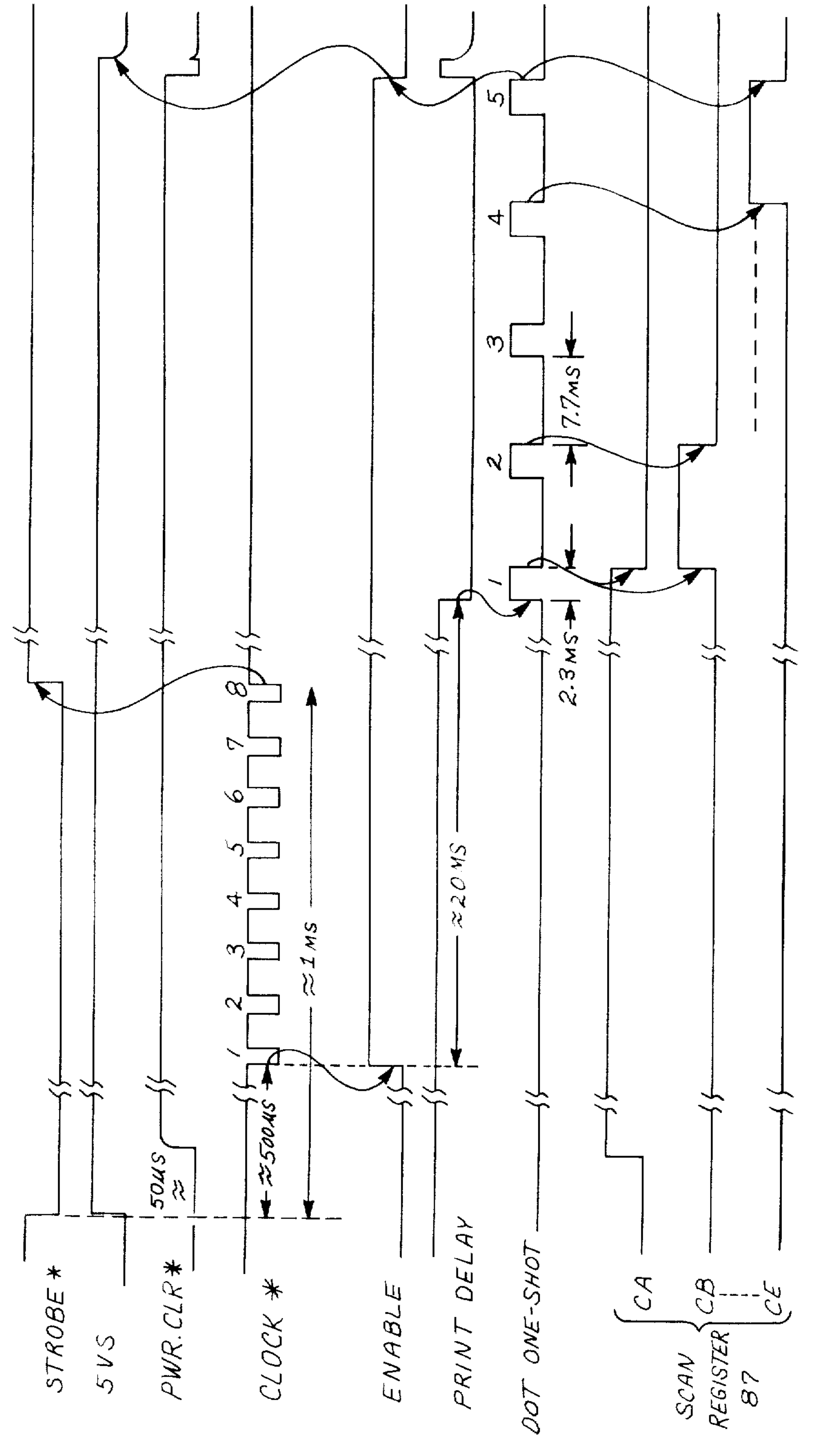
Figure 11:
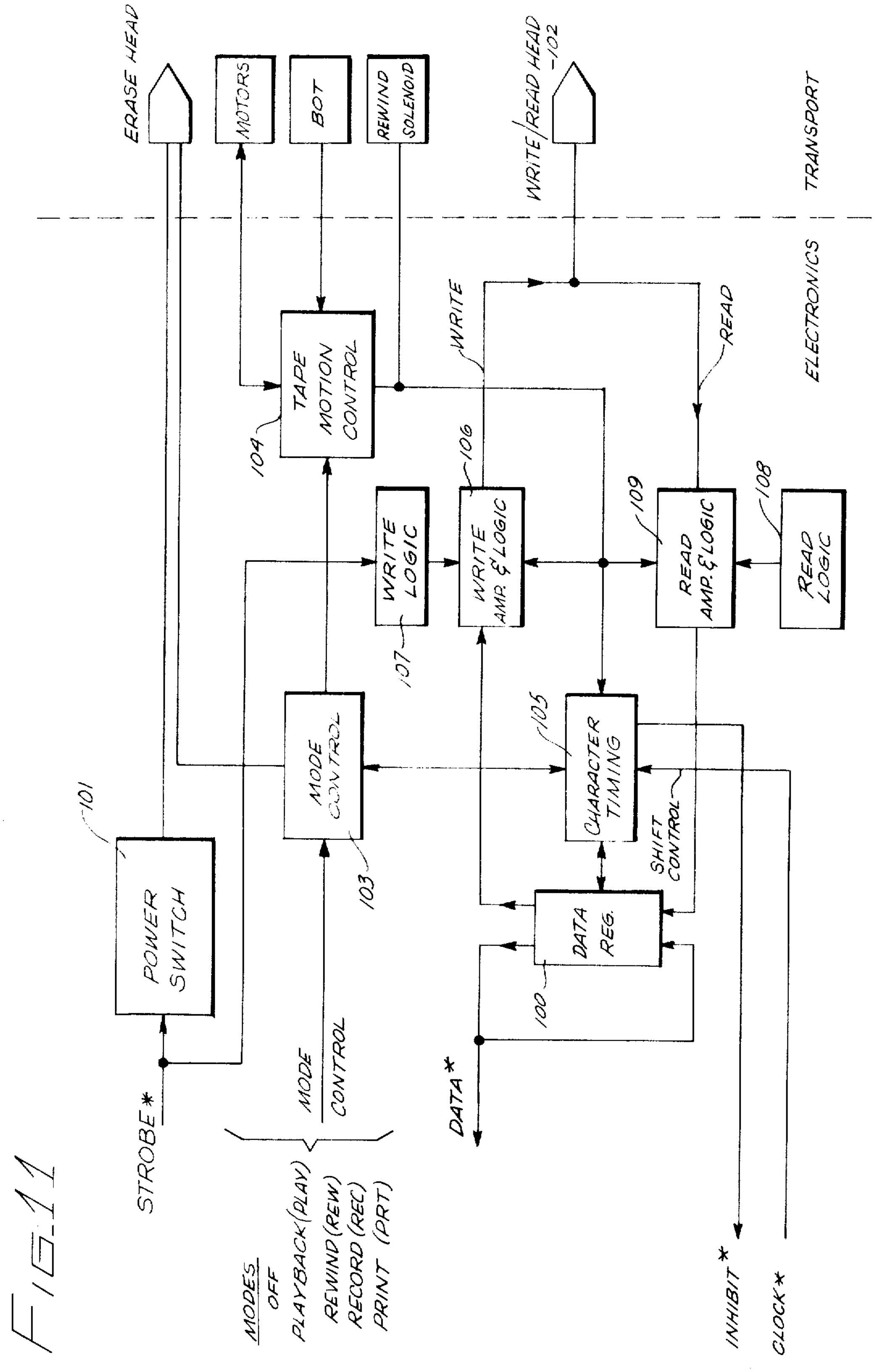

FIGS. 9 to 9C comprise a schematic circuit diagram of the keyboard electronic circuit elements of the data collection system;

FIG. 9D is a graphical illustration of the waveforms for keyboard circuits of FIGS. 9A – 9C;

FIG. 9E is a graphical illustration of the waveforms for a "header" operation in accordance with the circuits of FIGS. 9 – 9C;

FIG. 10 is a block diagram of a control arrangement for a printer module that may be employed in accordance with the concept of the present invention;

FIG. 10A is a graphical illustration of a timing diagram for the printer module of FIG. 10; and FIG. 11 is a block diagram of a magnetic tape recording module that may be employed with the system of the present invention.

Figure 1:
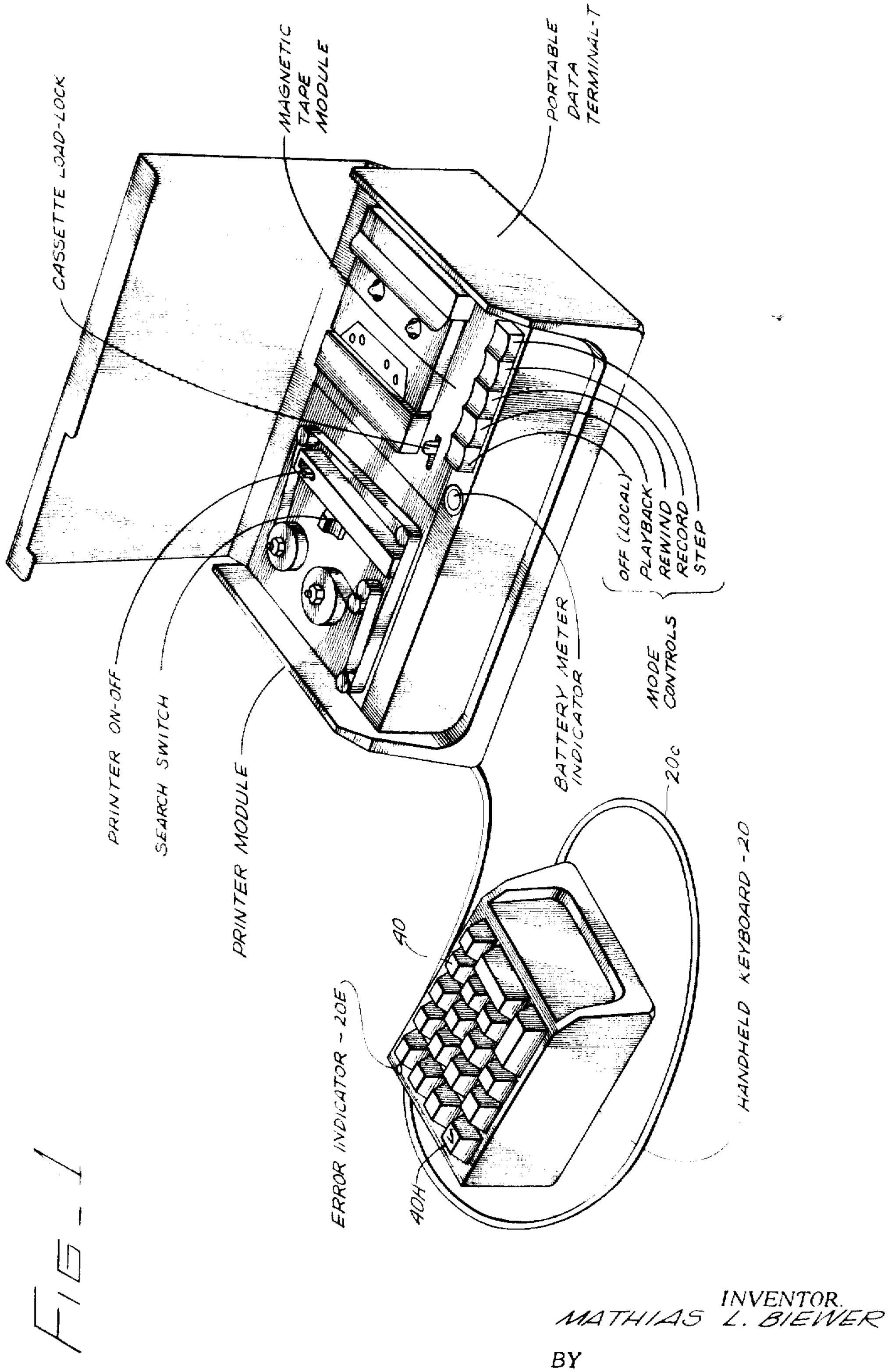
FIG. 1 is a perspective view of the portable elements of the data collection system embodying the present invention.

Now referring to FIG. 1, the general organization of the data collection system of the present invention will be examined.

The system comprises a hand-held keyboard 20 having a plurality of manually operated keys 40 to allow the data to be entered into the system. The keys 40 are arranged in rows and columns in accordance with a preselected format and each key is representative of an individual piece of data. The keyboard 20 is coupled by means of a cable 20C to a poratable data terminal T housing the electronic modules for the system. The data terminal T is of lightweight construction and may be used with a shoulder strap for supporting the terminal over the shoulder of the operator during the data gathering operation. This allows the operator to control the keyboard 20 and the data terminal T very simply and conveniently. As illustrated in FIG. 1, the terminal T includes magnetic storage means illustrated as a magnetic tape cassette for receiving and recording the data entered into the system by means of the keyboard 20. The terminal T is also illustrated as including a means for rendering the data entered into the system visible to the operator in the form of a strip printer. The data terminal functions are controlled through a plurality of mode control selector switches mounted to the front panel of the terminal T adjacent the magnetic tape module. The mode control switches are the power on/-off switch, tape playback switch, the tape rewind, record and stepping switch. In addition, a cassette load/-lock switch is mounted adjacent the mode control switches for controlling the placement of a cassette cartridge into the terminal T. The printer is also illustrated as including a printer power on/off switch for powering the printer unit along with a "search" switch for incrementally advancing the paper of the printer to allow information recorded thereon to be reviewed. A meter coupled to the battery circuits is also mounted adjacent the mode control switches. The meter is adapted to signal the voltage condition of the battery mounted in the data terminal T so that the operator can be aware of the condition at all times. For the same purpose an "error" light 20E is mounted on the keyboard 20 for signalling any errors detected in the system.

Figure 2:
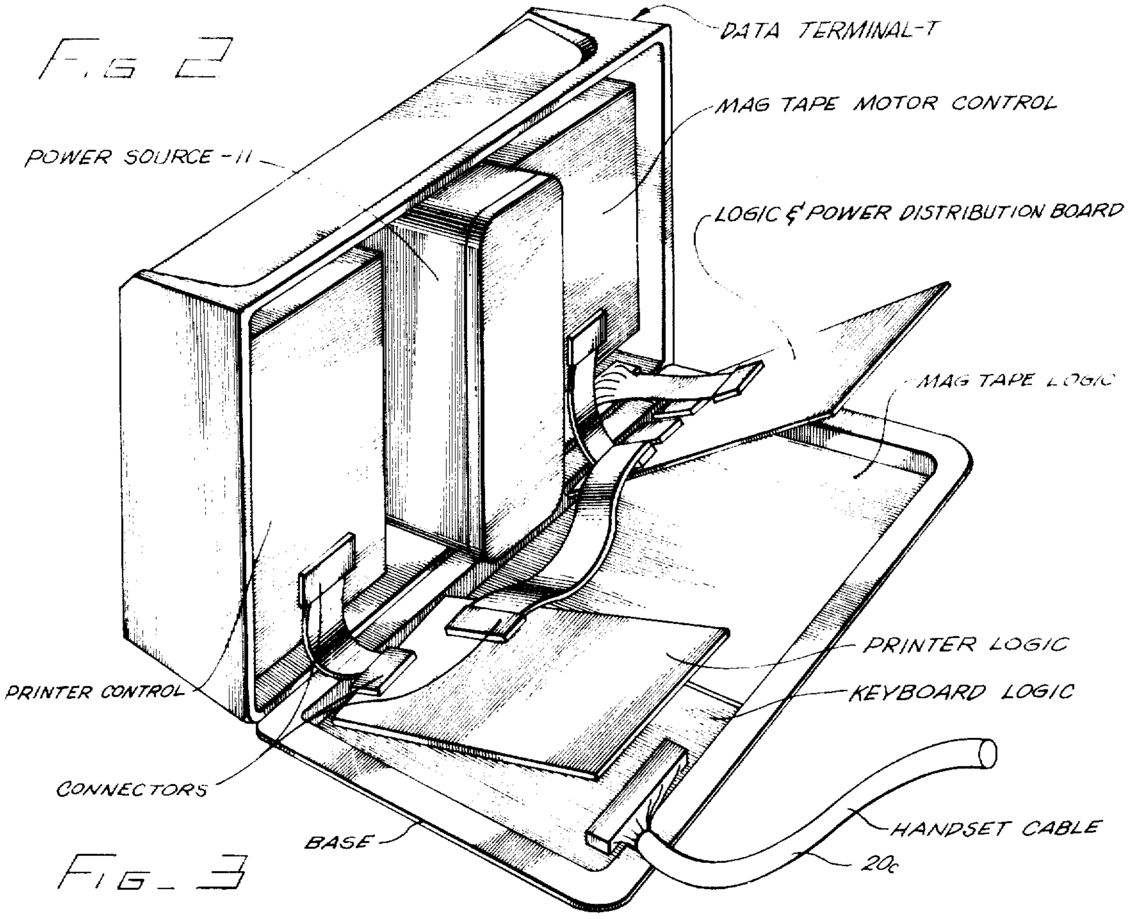
FIG. 2 is a perspective view of the data terminal of FIG. 1 and illustrating the internal configuration of the modules of the terminal.

The internal configuration of the data terminal T is illustrated in FIG. 2 as the invention may be embodied with a self-contained power source in the form of a battery. The electronic circuits for the system are arranged in modular form and may be readily coupled into and out of the system by a connector for coupling to a system bus that transfers signals to the various modules of the system including transferring the power to the modules that are activated by means of the aforementioned control switches.

Figure 3:
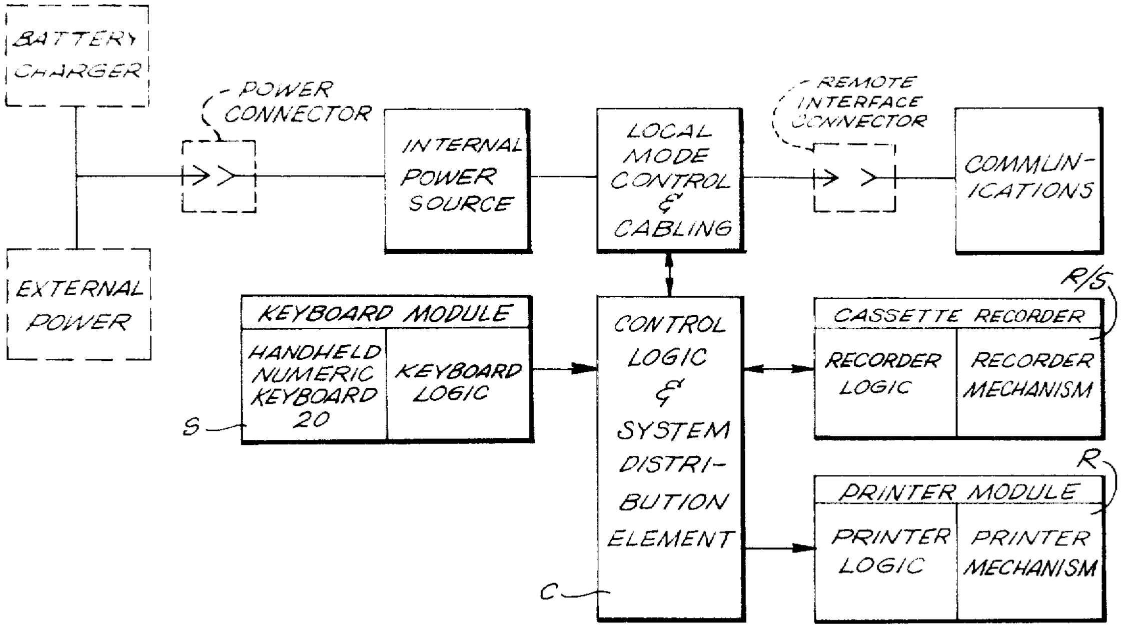
FIG. 3 is a general block diagram of the data collection system of the present invention in accordance with the embodiments of FIGS. 1 and 2.

The aforementioned general organization is illustrated in FIG. 3 in block diagram form for the embodiment of the invention illustrated in FIGS. 1 and 2. The same elements comprising the data collection system as illustrated in FIGS. 1 and 2 are illustrated in FIG. 3 along with the possible modifications to the system. These modifications include the provision of powering the system from other than an internal power source such as a battery and the provision for coupling a battery charger to the internal power source when a battery is employed. In addition, a "communications" module may be coupled to the system for transmitting and coupling data signals to the data terminal from a remote location. It will be recognized that other modifications are possible including the elimination of some of the basic elements of the illustrated system such as a printer. This visible means may be eliminated completely, or a visual, non-permanent display substituted therefor. This can be readily accomplished in accordance with the present invention by plugging in such a display module into the system bus, as will be evident immediately hereinafter.

Figure 4:
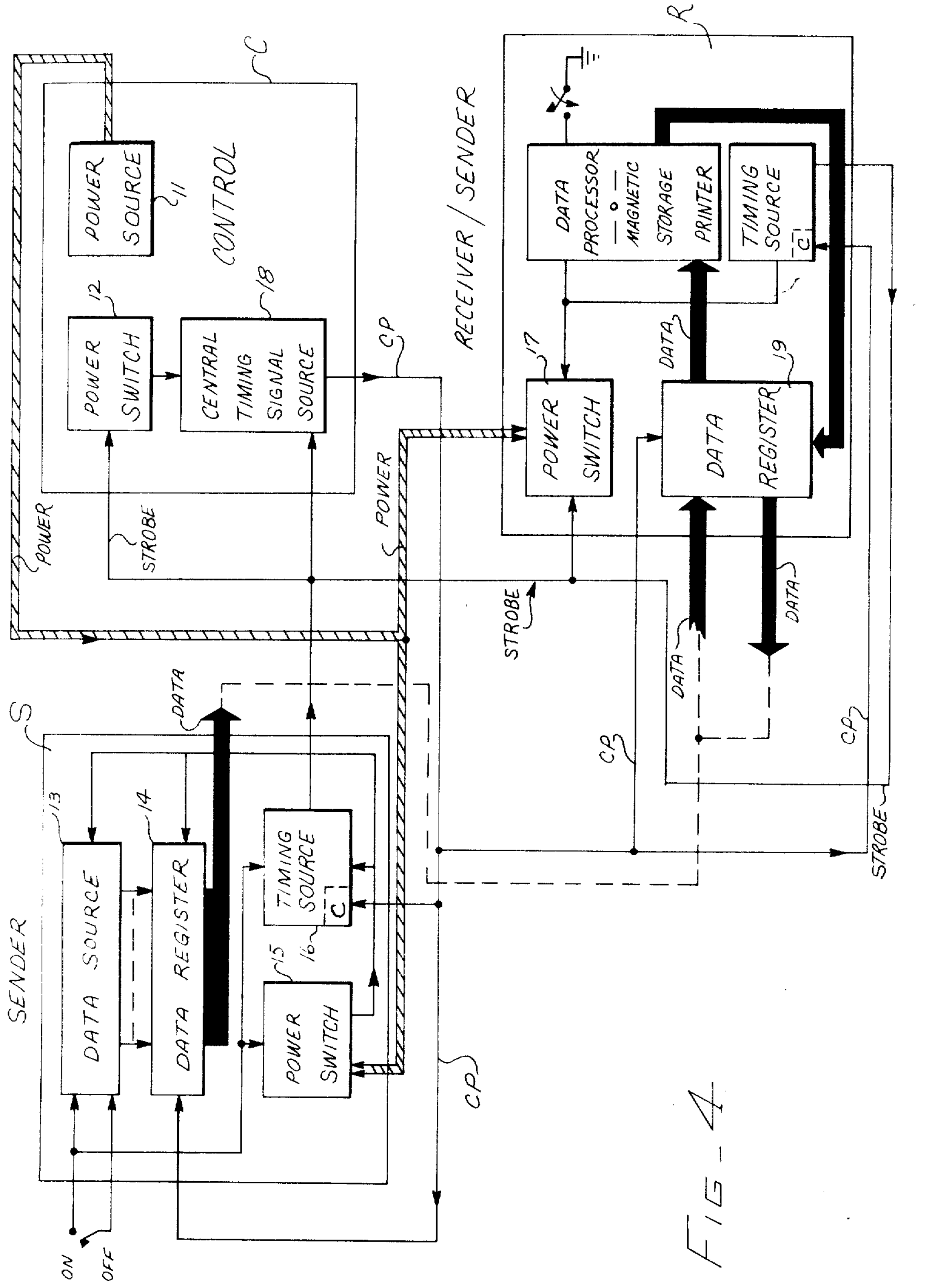
FIG. 4 is a block diagram of the data collection system embodying the present invention.

The concept embodied in the aforementioned data collection system basically comprises a sending element S, a receiving element R and a control element C. The receiving element R may also be adapted as a receiving/sending element R/S in accordance with the particular end function desired for the system. The collection system 10 of FIG. 4 is adapted to be powered from the control element C by means of a power pack or battery. The power pack or battery is identified in block form as a power source 11 contained within the control element C. The power source 11 is applied to the sending element S and to the receiving element R under the control of a switchable power switch 12 coupled thereto. In its normal condition the power source 11 is decoupled from the sending element S and the receiving element R as a result of the condition of the power switches therefor. The application of the power source 11 to the sending element S and the receiving element R will be discussed in more detail hereinafter.

In examining the sending element S for the present, it will be seen to comprise a data source 13. The data source 13 may be a keyboard element such as the keyboard 20 for generating data or may be an element having data previously recorded therein, such as a magnetic storage means.

However the data is orginally collected and introduced into the system, it is desired to transfer the data contained or generated at a data source such as the data source 13 to a receiving unit R. The data source 13 for the sending modules is coupled for transferring any data generated or stored therein to a local data register 14. The data source 13 is coupled to the power source 11 of the control element C by means of a power switch 15. The energization of the data source 13 is under the control of the on/off control switch which results in placing the sending module in the "ON," or active power condition, mode. Also associated with the sending element S in a local timing signal source identified as the timing signal source 16. These timing signals may also be considered strobe signals and are coupled to be responsive to the operation of the data source 13 for providing a timing signal of a preselected time duration. The strobe signal from the sending element S is coupled to the control element C and the receiving element R. The strobe signal is applied to the power switch 12 of the control element and a similar power switch 17 for the receiving element R for switching the power source 11 to each of these elements in response to the strobe signal.

The strobe signal from the generator 16 is also applied to a central timing signal source 18 for the control element C. The central timing signal source 18 is adapted for providing a preselected number of pulses defined in accordance with the desired time for transferring the data bits from one module to another module. To this end, each timing signal source 16 for a sending element includes a counter C for counting the clock pulses and terminating the strobe signal after a preselected count. The signals from the central timing signal source 18 control the transfer of data from the sender S to the receiver R. For this purpose the central timing signals or clock pulses derived from the source 18 are applied to the data register 14 of the sending element S and simultaneously to the data register 19 for the receiving element R. The clock pulses are effective for shifting the data stored in the data register 14 onto a system data bus and the bus is coupled to the data register 19 of the receiver R which is also responsive to the central clock pulses for serially shifting the data appearing on the data bus into the data register 19. At the termination of the strobe signal the power will be removed from the sending element S to terminate the transfer of data and at this time the central timing signal source 18 will also be terminated. The data, then, that has been generated or appeared at the data source 13 for the sender element S now appears at the data register 19 for the receiver R. The receiver element R may be defined to cause the element to be internally powered after the termination of the strobe signal to transfer the data now appearing at the data register 19 into a data processing element coupled thereto. This function will be described more fully herein after. The data processing element may be a magnetic storage system or a printout system in accordance with the desired end use for the collected data. In the event that the data is to be transmitted to a remote location over the telephone lines, the data in the register 19 may be applied to a magnetic tape recorder for recording the data on the magnetic tape in a suitable form for the purposes of developing audio tones from the magnetically recorded information as specifically disclosed in the copending patent application Ser. No. 724,973, now U.S. Pat. No. 3,576,433.

With the above described structural organizations in mind the implementation of the concept embodiment therein as applied to a practical, specific data collection system will be described in accordance with FIGS. 5 and 6. The data collection system of FIG. 5 comprehends a sending element S that is arranged for gathering and generating data by means of a keyboard 20 having a plurality of keys 40. The data generated from the keyboard 20 is under the control of control logic system distribution busses comprehended by the element C. The data gathered in this fashion may be applied to a magnetic memory element that may be adapted as a receiver or sender and to a printing element for printing out and rendering visible the information that is generated at the keyboard 20. The coupling or rendering active of the magnetic memory element or the printing element into the system and the selection of a particular function for each is under the control of a mode control element M having a plurality of manually operated switches that may be controlled for either playing back the information that is stored on the magnetic memory element or tape recorder or for recording thereon or for controlling the winding and unwinding of the magnetic element. In the same fashion the printing element may be coupled into the system through an individual switch. These switches are illustrated in FIG. 1 and are coupled to the control logic and system distribution element C for coupling the operative condition of the switches thereto and controlling the transfer of data from one active element to another active element or elements.

Figure 5:
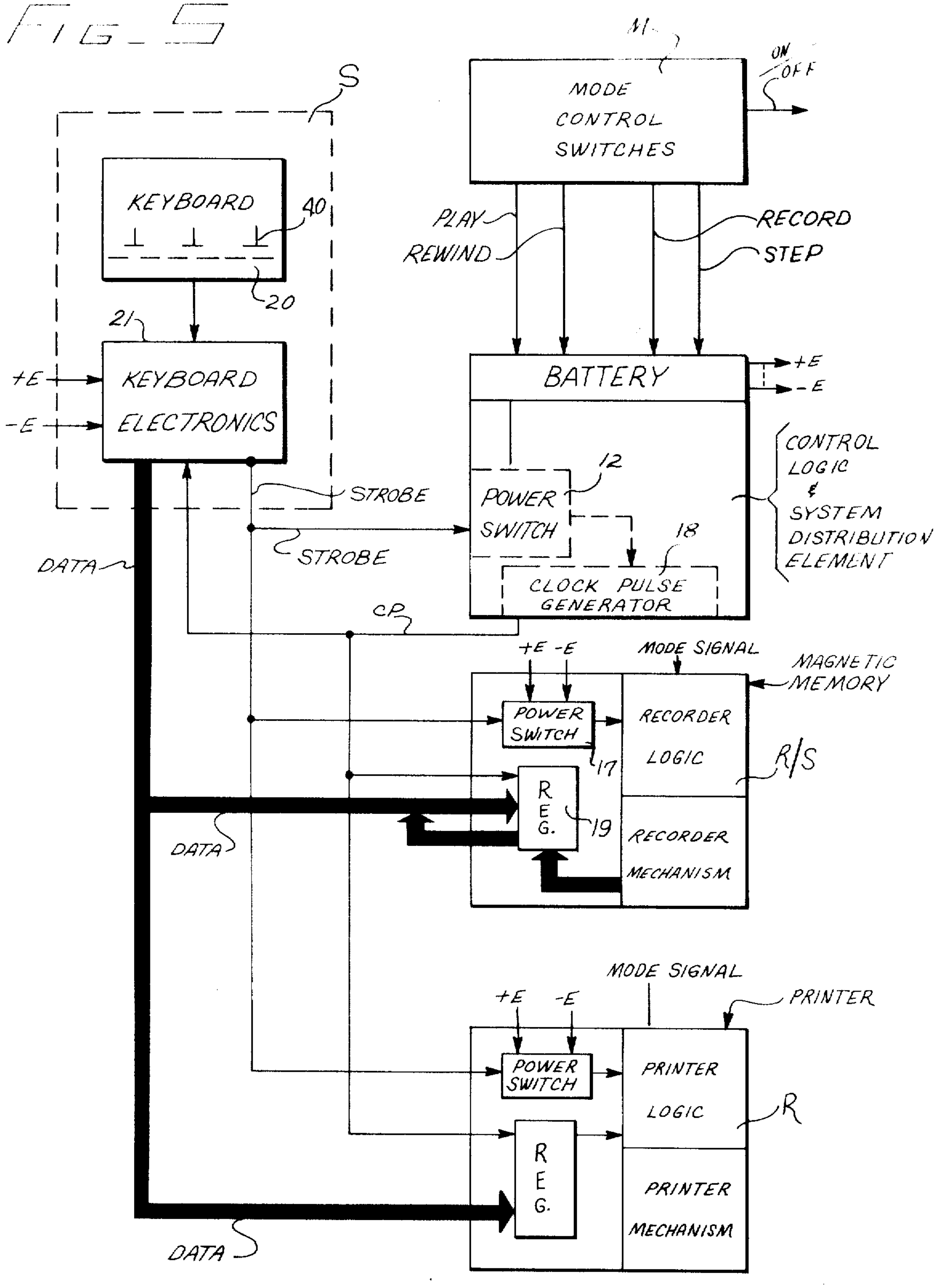
FIG. 5 is a general-block diagram of a particular data collection system in accordance with the system illustrated in FIGS. 1–3.
Figure 8B:
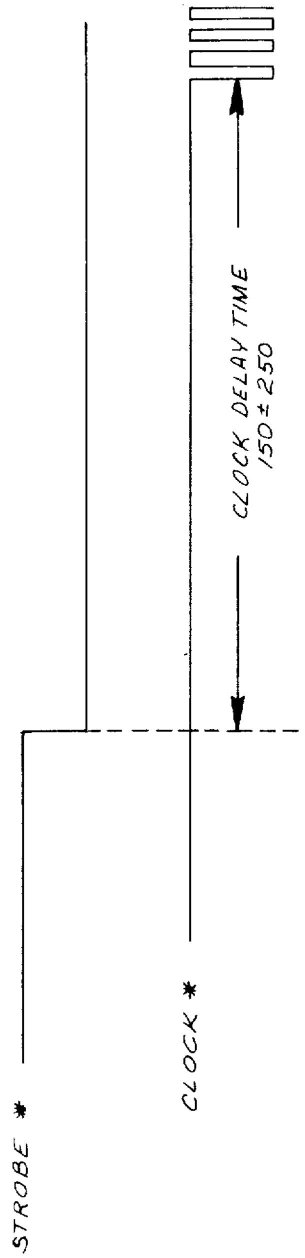
FIG. 8B is a graphical illustration of the clock delay and strobe waveforms for the system of FIGS. 7 and 8.

One of the important features of the organization of the data collection system illustrated in FIG. 5 is the control logic and system distribution element C. In accordance with the general organization of the system of FIG. 4, it will be recalled that the actuation of the data source is effective for producing a local timing signal which is identified as a strobe signal. The strobe signal is applied in parallel circuit relationship to the power switch 12 for the control element C as well as to similar power switches for the magnetic memory element and the printing element. The strobe signal is arranged so that during the inactive period of the sending unit S, it is in a high voltage state as represented in FIG. 6. The actuation of a key 40 on a keyboard 20 will trigger the local timing generator and the strobe will be placed in a low voltage state for a preselected time interval. This low voltage state is effective for switching all of the power switches in the system modules that have been activated. This causes the battery power to be applied to these modules for the time interval that a strobe signal is maintained in its low voltage state.

Figure 6:
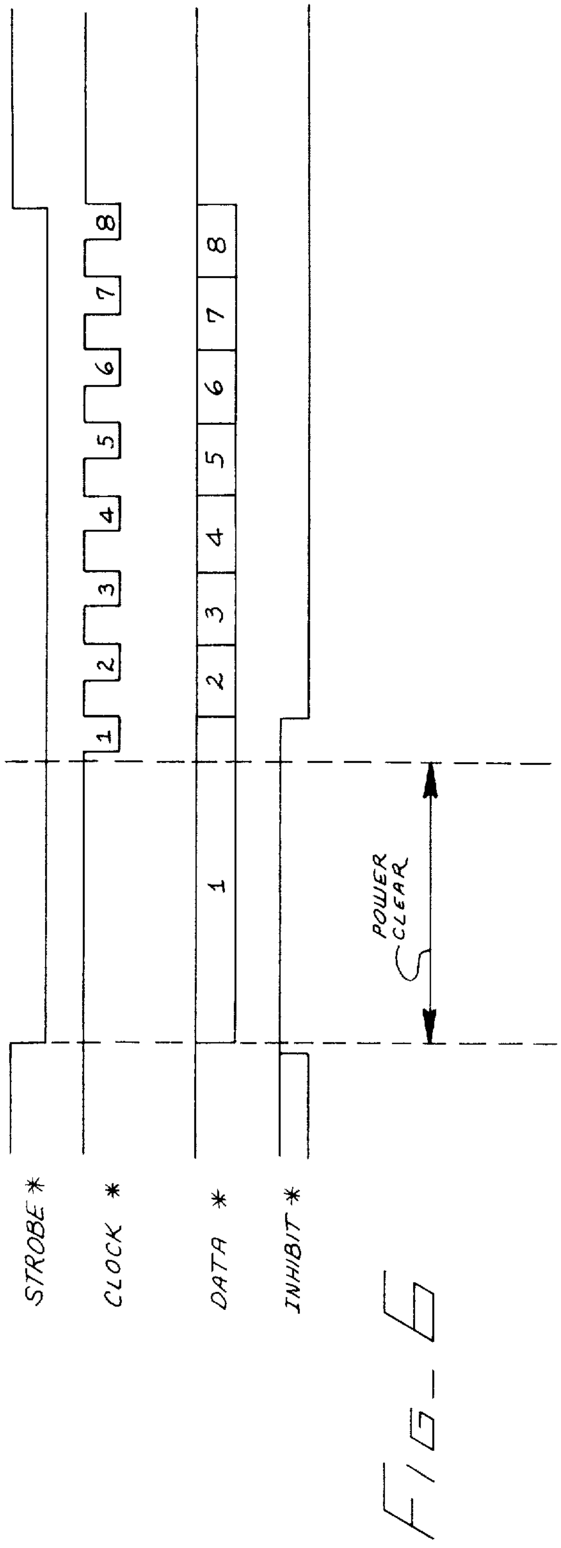
FIG. 6 is a graphical illustration of the timing signals for the transfer of data in the system of FIGS. 1–5.

The active or operative state of the signals of FIG. 6 illustrating the data transfer timing is indicated by identifying the function of the signal with an asterick (*). This is true throughout the data collection system. The clock pulses are applied to the keyboard electronic circuit means 21 for the sending element S and also to the data register for the magnetic memory element and the printing element. As is evidenced from examining FIG. 6, the switching of the strobe signal to its low state will initiate the clock pulse generator only after a preselected time delay. This delay is identified in FIG. 6 as a "power clear" interval and during this interval the clock pulse generator is not actuated. The pulses from the generator 18 are generated beginning with the clock pulse "1" as identified by the low voltage condition of the clock. The "power clear" time interval is defined as the interval prior to clock pulse "1" and after the strobe is in a low voltage condition to all of the modules of the system to be cleared of any data that may be present therein in preparation for the new data to be transferred. The clock pulse generator 18 is constructed and defined as illustrated in FIG. 5 for producing eight sequentially occurring pulses. At the end of the eighth clock pulse the strobe signal will return to its high voltage condition and therefore decouple the power from the sending element S and terminate the generation of the clock pulses from the clock pulse generator 18. The further processing of the data now residing in another module in the magnetic memory module or the printer module is under the control of the particular module. These additional functions will be specifically described in conjunction with the detailed descriptions of the individual modules.

Figure 7:
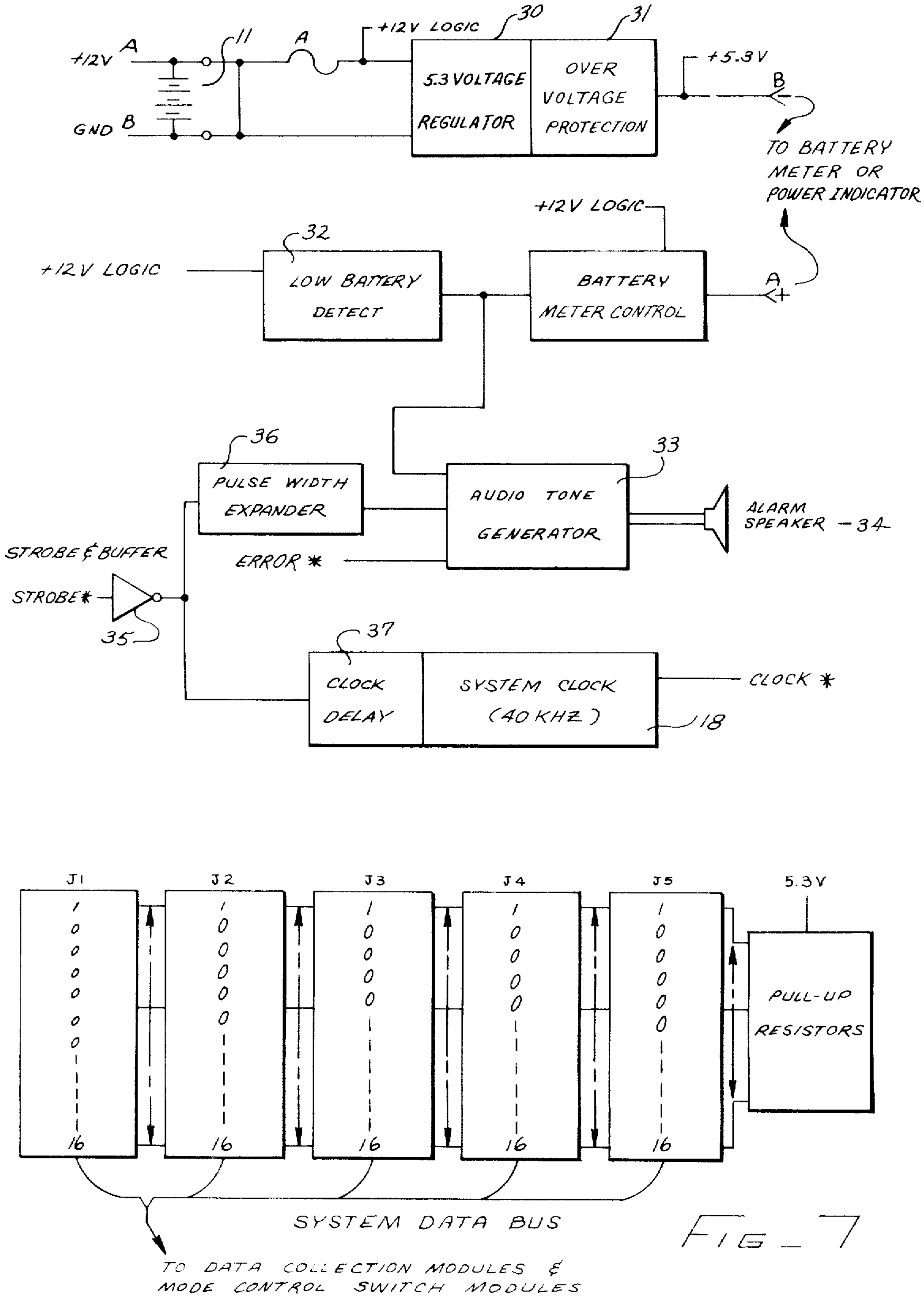
FIG. 7 is a block diagram of the logic and control element for the system of FIGS. 1–5.

Now referring to FIG. 7, the general organization of the control logic and system distribution element C including the system bus means will be examined in detail. The element C is illustrated with an internal power source 11 in the form of a 12-volt battery for powering all of the elements or modules of the data collection system. The control element C is adapted to power the active elements of the system in accordance with the demand therefor as initiated by the data collection operation or data transfer operation. The elements or modules of the system are rendered active by controlling the operative conditions of the mode control switches and the power switches therefore; See FIG. 1. For this purpose the battery 11 is applied to a voltage regulator for maintaining 5.3 volts output from the battery for powering the various modules of the system. The voltage regulator is identified by the reference numeral 30 and is arranged with an over voltage protection element 31. The output voltages derived from the battery 11 are identified as plus 12 volts for the "logical" elements of the system elements as well as the positive 5.3 volts. The negative terminal of the battery 11 is connected to ground potential. The voltage terminals of the battery are also connected to a battery meter for visually signaling the condition of the battery to the operator; see FIG. 1. The battery meter is connected to a low voltage battery detecting element 32 for detecting when the battery drops below the 10-volt level. The low voltage condition signal from the low battery detect 32 is also applied to an audio tone generator 33 for generating the audio tones for audibily signaling to the operator the low voltage contition. The audio tone generator may be coupled to an alarm speaker 34 for this purpose. In addition, the ERROR* signal is coupled to a visual error indicator which may be the error light 20E mounted on the keyboard 20; see FIG. 1. The audio tone emitted from the speaker 34 may be on the order of 2 kilohertz.

The strobe signal coupled from the sending element S is applied to the control element C by means of a strobe/buffer power switch 35 for coupling the 5.3-volt battery output voltage therethrough to the clock pulse generator 18 for activating it. The output of the buffer 35 is also applied to a pulse width expander or stretcher 36 which has its output coupled to the error tone generator 33. The pulse expander 36 is defined to hold the generator 33 in an operative condition long enough so that a click can be heard each time a strobe pulse occurs. The output of the buffer 35 is also applied to a clock delay element 37 for a "power clear" interval and which element in turn is coupled to the system or central clock pulse generator 18. The system clock may produce pulses on the order of 40 kilohertz. The clock delay interval is defined for the purposes of clearing the other modules of the system and is specifically defined in accordance with the graphically timing intervals.

The other important feature of the control and system distribution element C is the provision of a system data bus for coupling all of the necessary signals from module to module to allow the various data collection modules to be readily connected to the system bus means by means of conventional connectors. This allows the configuration of the system to be readily changed by merely connecting and disconnecting selected modules to the system bus. For this purpose, five connectors are illustrated as connected to 16 different buses. The connectors are identified as the connectors J1 – J5. The buses are individually defined for coupling a particular signal to all modules coupled to the system bus. In addition to the voltages derived from the power source 11, the buses couple the strobe*, data*, clock pulses* and the various mode control and data handling control signals.

Figure 8:
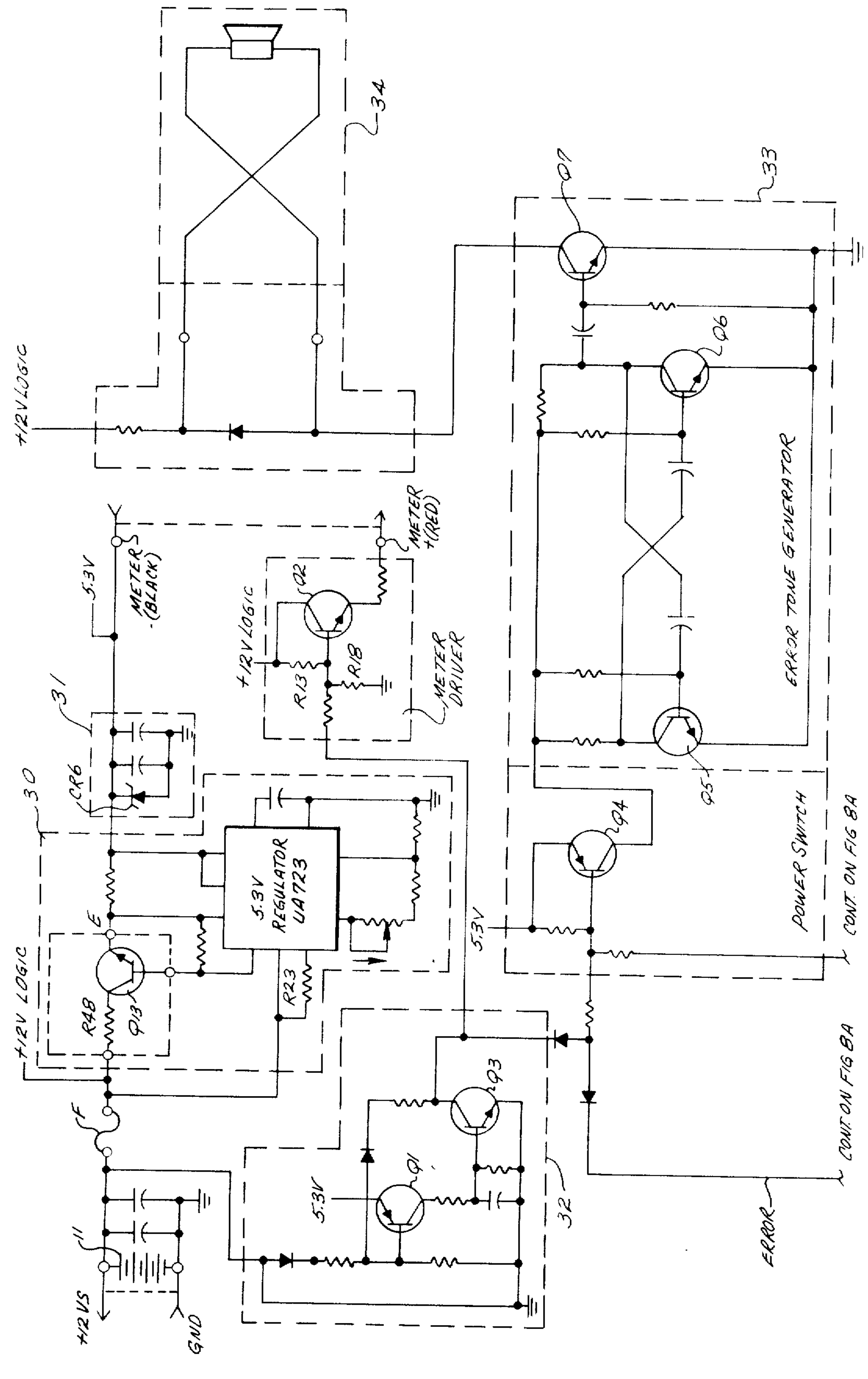
FIG. 8 and 8A are schematic circuit diagrams of the control element illustrating the system bus in detail in accordance with the block diagram of FIG. 7.
Figure 8A:
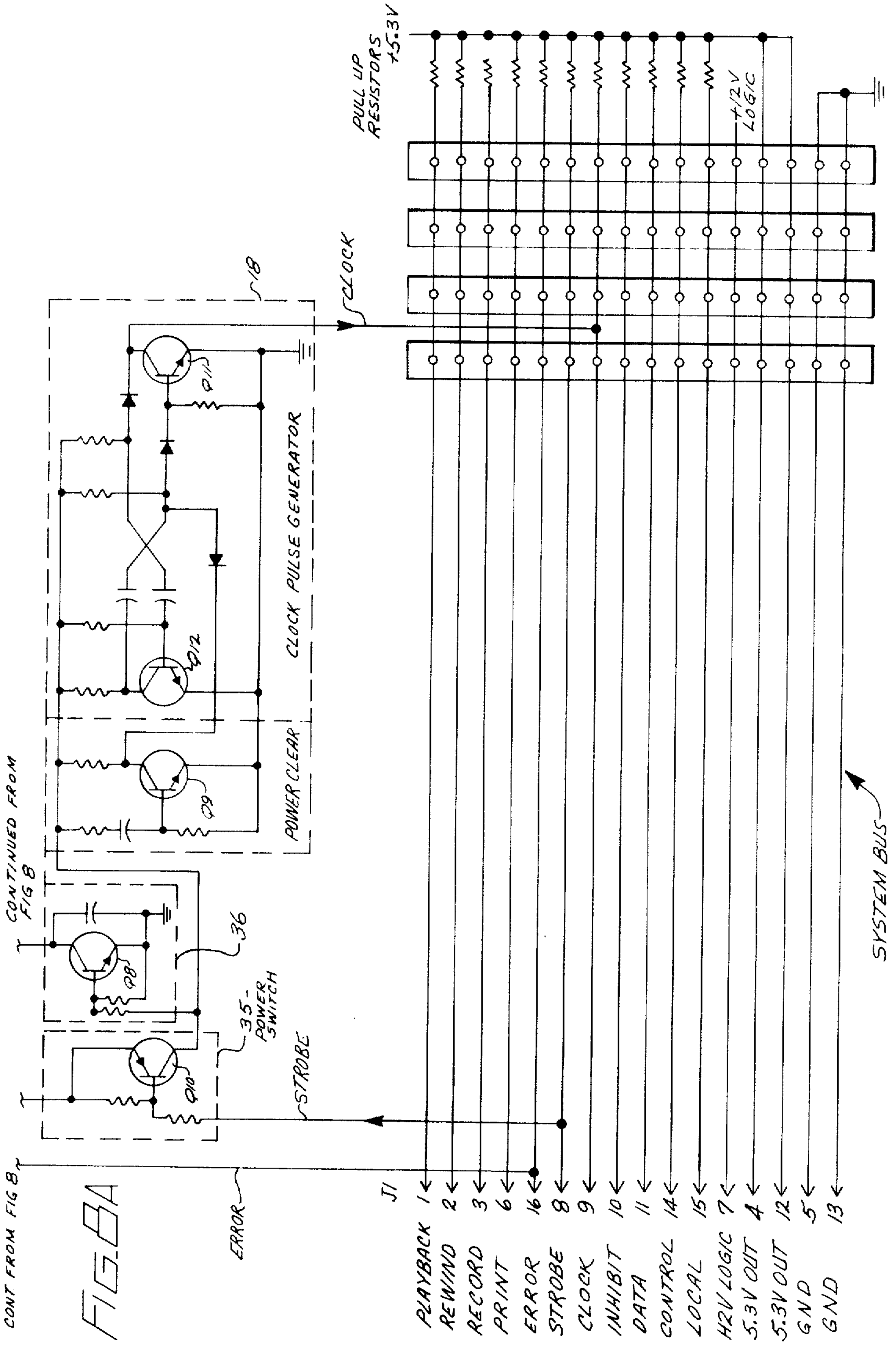

FIG. 8 illustrates the control logic and system distribution element C in detailed schematic circuit form in accordance with the general organization of FIG. 7. The voltage regulator 30 as illustrated in FIG. 8 is an integrated circuit type voltage regulator identified as a UA 723 integrated circuit. The 5.3 volt output is internally controlled by the voltage regulator, the output of which is connected to the base of a series pass transistor Q13. The regulator is powered through the battery 11 and the power sharing resitor R48 and R23, as illustrated. The regulator also limits the instantaneous output current to approximately 2.4 amperes. The overvoltage protection circuit 31 is to prevent over voltage damage to the integrated circuits of the data collection system in the event the regulator 30 should fail or is shorted out during testing. If the failure causes the 5.3 volt output to exceed a preselected upper voltage the zener diode CR6 will conduct to ground. If the voltage exceeds the preselected upper voltage CR6 will fail and the fuse F will open up. It should also be noted that the low battery detect 32 consisting of the transistors Q1 and Q3 also function as a latch so that when the voltage at the base of Q1 drops below the 5.3 volt level both Q1 and Q3 will latch in a saturated state and will remain in this latched state. In this condition an output from the collector of Q3 will trigger the power switch in the form of the transistor Q4 as the input element to the audiotone or ERROR tone generator 33. This condition will maintain the audio signal generator in an active condition to signal the low battery voltage to the operator. This ERROR* signal is also coupled from an individual system bus as illustrated.

Another aspect of the power supply is the provision of a battery meter for visually detecting the condition of the battery. The meter is provided with a meter control circuit illustrated as a transistor driver Q2 which is coupled to be responsive to the output signal of the transistor Q3 for the low voltage detector 32. For this purpose the 12-volt battery voltage is divided down by a resistor network comprising the resistors R13 and R18 and applied to the base electrode of the meter driver transistor Q2. The battery meter current flows from the Q2 emitter through the meter and to the 5.3-volt output. The battery meter current is proportioned so that if the 12-volt logic is at 12 volts the meter will indicate midscale. The face of the meter has red and green areas thereon for signalling the battery voltage condition. Accordingly, when the 12-volt is present the meter needle will rest between the red and green areas. When the battery exceeds the 12-volt level or is on the order of 13.5 volts the battery meter needle will rest above the green area and in the middle of the red area when the voltage drops to around 11.5 volts. When the low voltage condition exists, the low voltage detecting element 32 latches and the transistor Q3 will be conducting and therefore cause the meter driver transistor Q2 to be rendered non-conductive and the battery meter current to be driven to "0."

It will be noted that the strobe * signal received from a receiving element is coupled to the control element C through the base of power switching transistor Q10. This transistor Q10 acts as a power switch and has its collector electrode connected to a power clear transistor Q9 arranged at the input of the clock generator 18 and also as a voltage input to the pulse expander 36. The clock pulse generator 18 comprises the transistors Q11 and Q12 arranged as a conventional multivibrator. The output pulses of the generator are derived from the collector electrode of the transistor Q11 and are coupled to the clock bus as the signal clock*. The system data bus is as illustrated in detail in FIG. 8 and consists of five 16 pin connectors for coupling to the 16 buses in parallel circuit relationship. The data handling function buses are individually connected to a pull up resistor to the 5.3 voltage terminal so that they couple 5.3 volts to the modules in their active states. It will be recognized that the mode control functions are dependent on the operative condition of the mode selector switches and are coupled to the individual buses to the element C through the element M as illustrated in FIG. 5. The detailed implementation of these switches is not illustrated in detail as it is considered conventional.

Now referring to FIG. 9, the portable keyboard 20 and the electronic circuit means associated therewith will be described. The keyboard 20 is a keyboard having a plurality of manually operated keys for signaling the particular characters to be entered into the system. The keys symbolized by the key 40 are arranged in an electrical matrix of rows and columns. The matrix arrangement as illustrated in FIG. 9 comprises 16 rows and 4 columns with a resistor coupled in series with each lead wire for the rows and columns. The row resistors are identified as $R_R$ and the column resistors as $R_C$ in FIG. 9. It will be recognized that when a key 40 is actuated it will close the electrical circuit between a row bus and a column bus thereby signaling the operation of a key. For example, the key 40 when operated will short circuit the column 4 bus with the row 2 bus to indicate this condition. This, of course, will provide a voltage drop across the corresponding row and column resistors. (If power is on, there is already a voltage drop across the row resistors.)

At this point it is well to consider the coding for the characters represented by the keys on the keyboard. The coding of the keys is considered to be in accordance with the U.S. standard code for information interchange which is commonly identified as the ASCII code. The schematic illustration of the keyboard illustrated in FIG. 9 represents the key contacts as indicated in their position on the matrix according to the character locations on the chart for the ASCII code. For this purpose only columns 2–5 on the ASCII chart are employed in the present keyboard representing a total of 64 characters. In accordance with this scheme, then, when the key representing the character B is actuated it will provide a circuit between row 2 and column 4 and select the matrix point given by their intersection. If reference is made to the ASCII chart it will be seen that this row and column location for the character B is identical to its location on the ASCII chart.

The operation of the keys 40 to the keyboard 20 is detected by means of a key detect circuit 41 coupled in common to the column resistors $R_C$ of the keyboard. The key detect circuit will be operative when the potential level on one of the resistors $R_C$ drops to switch a power switch to its active conductive condition and applies 5 volts to the elements of the keyboard system. This circuit will be described more fully hereinafter. The signaling of the value of the actuated key is effected by means of a two-stage counter that is under the control of an oscillator 42. The oscillator output is identified as the counter clock output and is applied to a 4 bit binary counter 43 coupled to a two bit binary counter 44. The 4 bit binary counter has its output signals coupled to a conventional four-line to 16-line decoder 45 for decoding the pattern of four binary signals received from the counter 43 in parallel circuit relationship into a pattern of sixteen output lead wires. The operation of the decoder 45 is such that in response to any one of the output patterns of the binary counter 43, only one output from the decoder 45 will be in the low voltage state for scanning the rows of the matrix of keys 40. In the same fashion, the output signals from the two bit binary counter 44 are applied to a 4 input multiplexing network 46. When both counters have advanced to the state where the closed key 40 connects a selected decoder output with a selected multiplexer input, the low voltage on the decoder output propagates to the multiplexer output, identified as stop counter. This signal is applied to the oscillator 42 for stopping the generation of the pulses from the oscillator, thereby stopping the two counters 43 and 44 in the ASCII state representing the character of key 40.

The outputs of the counter 44 are identified by the four output signals *b*5, *b*5*, *b*6 and *b*6*. Three signals are applied to the four NAND gates 60–63 having three input signals coupled thereto for providing the stop counter signal to the oscillator 42. The NAND gate 60 is coupled to be responsive to the *b5** and *b6* output signals from the counter 44 and the signals on column bus 2 of the keyboard matrix. The NAND gate 61 is responsive to the column 3 signal from the keyboard matrix along with the signals *b5* and *b6* from the counter 44. The NAND gate 62 is responsive to the counter *b5** and *b6 along with the matrix column 4 signal. The matrix column 5 signal is coupled as one input to the NAND gate 63** along with the *b5* and *b6 signals from the counter 44. The outputs of the NAND gates 60–63 are connected together for providing the stop counter signal when any one of their input conditions are satisfied as a result of the operation of a key 40**.

The information stored in the counters 43 and 44 may then be transferred into a local data register 47 for storing the six bits from the two counters 43 and 44 plus a seventh bit which is the inverse of *b6*. This data transfer is affected through the scan retriggerable multivibrator 48 and a data available flip-flop 49 controlling the load register one-shot 50. The scan one-shot 48 is responsive to the counter clock signal derived from the oscillator 42. As long as the oscillator 42 is not stopped, the scan retriggerable multivibrator 48 will be retriggered to a high state. When it goes to a low state, data may be loaded. The flip-flop 49 triggers the one-shot 50 for providing the output signal LR* to the register 47 for transferring the data from the counters 43 and 44 into the data register 47. It will be recognized that the data register 47 is illustrated in terms of an integrated circuit and is known to include an appropriate gating network for entering the data into the register 47. The data available flip-flop 49 and the register available function were set to "0" and "1" by power clear*. The entry of the data into the data register 47 will cause the data available signal and the register unavailable signal to be switched to "0" and "1," respectively. The RUV signal will then be "1" for indicating that the register 47 is occupied or unavailable. When the data register 47 has been loaded, the data is now available for transfer onto the system data bus. Before examining this operation, the powering of the keyboard module will be examined.

The key detection circuit as represented in FIG. 9 couples one terminal of each of the column resistors $R_C$ for the keyboard matrix as an input signal to a power circuit 41 for maintaining power on the module for the data transfer interval. This signal is coupled directly to the base of the transistor Q11. Upon operation of the record switch, the record line is brought to ground enabling the key detection circuit and therefore the keyboard electronic circuit module itself. The operation of the key 40 of the keyboard will connect a row and column resistor to form a circuit between these resistors to ground for signaling the operation of a key and causing power to be applied and maintained on the module for the desired interval. The transistor Q11 along with the transistor Q8, Q9 and Q10 comprising a power switch circuit 41S. The transistor Q10 is coupled to receive the RECORD* signal, when the record button is depressed, from the system bus to condition the circuit 41S for a power switching operation when a key 40 is operated and detected. The power switch 41S is in turn coupled to a power clear circuit 41C comprising the transistors Q2 and Q1. The power clear circuit 41C will generate a PWRCLR*, power clear signal, which will set the keyboard storage elements to their proper initial states. Accordingly, with the power on the module, the keyboard logical elements are in their proper state, the actuation of a key 40 has been detected and the data may be processed.

In this particular embodiment of the keyboard module an ID generator 65 is included and as illustrated is arranged in the data path between the counters 43 and 44 and the data register 47. The ID generator 65 is responsive to the operation of an ID key ("<") 40H on the keyboard 20 for generating a unique signal identifying the particular keyboard or piece of equipment that is transmitting the information to a remote location. With each operation of the ID key the same information then will be generated and transferred into the data register 47. The depression of the ID key produces an ID symbol ("<") along with a four character identifier, following the ID character itself. The four character identifier may consist of any four characters within the portion of the ASCII chart utilized for the purposes of the invention. The ID generator 65 as illustrated in FIG. 9 comprises four columns of diodes having their cathodes connected together on a common bus. The columns for the ID generator 65 are identified as the columns ID0, ID1, ID2 and ID3. Each column consists of six diodes and their common bus and represents one character. The columns are connected to an ID counter 64 having four outputs identified as the outputs CO*, C1*, C2* and C3*. The depression of the ID key is sensed by a two input NOR gate. The output of the NOR gate is ID and goes TRUE when a depression of the ID key is detected bringing the corresponding matrix and column row to "0." ID* is the serial input to the five bit ID counter 64. The individual preset inputs to the ID counter 64 are tied to the 5-volt bus and therefore all of its parallel outputs are set to the "1" state upon 5V turn-on.

The clock input to the ID counter 64 is LR*. Since ID* is in the "0" state only when the ID key is depressed, the ID counter's parallel outputs remain in the "1" state following the receipt of the LR* signal unless the depressed key is the ID key, in which case the "0" is clocked in at the trailing edge of the load pulse. This causes the ID mode to be immediately followed by the loading of the ID character ("<") itself. The "0" on the serial input is clocked into the first flip-flop of the ID counter 64 which in effect is a shift register and causes the CO* output to go to "0." This drives the ID gate ID6 to "1." The ID6 and ID6* signals lock the keyboard electronics into an ID mode of operation by setting the ASCII outputs of the counters 43 and 44 to "0," the data available flip-flop 49 to "1" and inhibiting the scan retriggerable multivibrator 48. This operation allows the data to be entered into the data register 47 from the ID generator 65 since the setting of the counters 43 and 44 to "0" effectively disconnects their outputs. By setting the data available flip-flop 49 to "1," the four key identifier may be automatically loaded into the data register 47. With the data available register 49 in the "1" state after the shifting out of one character into the shift register of the data register 47, the continuous loading of the characters is assured as the register available signal goes to "0" following the trailing edge of the eighth clock pulse. Also, it will be noted that the inhibiting of the scan retriggerable multivibrator 48 prevents any error that may result by the coincidence of a scan and the data available signals and also prevents the resetting of the ID counter 64.

The second load pulse then will load the first of the four character identifiers into the data register 47. The trailing edge of the second load pulse will clock the "0" from the CO* stage to the C1* stage and at the same time the CO* will be shifted back to the "1" state. The ID* will be returned to "1" by the resetting of the counter 64. A single "0" then will be stepped from the CO* to C1* successively down the stages of the counter 64. The second character is loaded by the third load pulse, the third character by the fourth load pulse and the last by the fifth load pulse. The remaining output from the ID counter 64 is the E0ID or end of ID signal. The trailing edge of the fifth load pulse shifts the "0" into the E0ID* or end of ID state. The E0ID* signal will set the data available flip-flop 49 to "0" which will then take the circuitry out of the automatic loading mode. At this same time C3*, or the last input to the four input ID gate ID6 goes to "1." This takes the keyboard out of the ID mode and allows the scan signal to return to its "0" level state but since the data available flip-flop 49 has been reset, no error results.

At this point the transfer of data from the keyboard modules to the other modules of the system will be discussed with reference to the timing diagrams for such a data transfer as indicated in FIGS. 9D and 9E. The timing diagram illustrated in FIG. 9D is for a single key depression on the keyboard 20 while FIG. 9E is for an ID operation. When the data register 47 has been loaded the STROBE* signal immediately drops to its low voltage condition as indicated in FIG. 9D. This STROBE* signal will be in its low voltage condition only if the inhibit* signal is in a high voltage condition indicating that all registers are available in the other data modules for accepting the data stored in the data register 47. It will be recognized that the inhibit signal in its two conditions will signal whether or not a register is available for accepting data and is much like a busy signal on a telephone line which results upon dialing a particular number. With the STROBE* signal in its low condition the central clock pulse generator 18 will be triggered and the clock* signal will not be applied to the data register through the appropriate clock buffering network illustrated in FIG. 9 for shifting the data bits out of the register 47 in a serial relationship. The bits shifted out of the data register 47 will be shifted onto the data* bus of the system. The information will be shifted out of the register with the least significant bit first, or bit b1, and with the parity bit generated by the parity flip-flop 70 last.

The RUV function sets the STROBE FF and the STROBE* bus output goes "low" (provided INH* is "high"). The CLOCK* pulse from generator 18 will now start clocking the character out on the DATA* bus line, on its trailing edges.

The states of the first seven bits are sensed by the Parity flip-flop 70 as the character is being shifted out of the DATA Register 47. At the trailing edge of the seventh CLOCK*, the correct parity bit is inserted, becoming the eighth and last bit of the ASCII character. Timing is provided by the binary counter 73. Its first three bits count the number of clock pulses received on the CLOCK* bus line. Count seven is sensed by a 3-input NAND gate 74 generating PE* (Parity Inhibit). PE* inhibits the insertion of the parity bit except for the duration of the eighth bit time. The DATA* gate is enabled during the duration of the parity bit, since the logical 1 loaded into the Data Register 47 in the eighth bit position is now appearing on the register output. PE* returns "high" on the trailing edge of the eighth CLOCK*, see FIG. 9D. PE is used to clock STROBE* back to "1." At this time, the third bit of the binary counter 73 also clocks RUV back to "0," indicating available register. When the register unavailable signal, RUV goes to "0" after the eighth clock pulse the character or the information in the data register 47 has been processed and thereby the STROBE* returns to its high voltage condition as indicated in FIG. 9D. Normally this will occur long before the key on the keyboard 20 is actually released. If, however, the key should be released prior to the occurrence of the eighth clock pulse the signal being "1" will keep the 5 volts on the keyboard module. Also, when the operated key is released the oscillator 42 will have its stop counter signal removed so that the scan flip-flop 48 will again be triggered. However, since the scan signal will only terminate after a key closes and the data available flip-flop 49 will be set on the "1" state on the scan signal trailing edge, no erroneous data will be entered into the system. At this point it should also be noted that the 5 volt power applied to the modules usually turns off upon the release of a key 40 on the keyboard 20. However, during the header operation of the keyboard the key 40 will be terminated prior to the turn off of the 5 volts for which purpose the RUV signal holds the power on until the last character has been processed. The power switch 41 will be unlatched at the end of the data transfer.

Now referring to FIG. 10, a receiving module in the form of a printer as it may be employed in the system of the present invention will be described. The printer provides a visible indication of the information that has been entered into the data register 47 that has been entered into the system bus so that it may be recorded on the magnetic memory or tape module. One such printer that may be employed as a printer module for the present invention is described in the copending application entitled Printing Apparatus and bearing Ser. No. 104,352 and assigned to the same assignee as the present application. Reference may be had to the copending patent application for a more complete disclosure of the printing apparatus per se. The present description will merely indicate how such a printing apparatus may be employed in combination with the system aspects of the present invention. Specifically, the information stored in the data register 47 for the keyboard element 21 may be transferred to a data register for the printer module and this information may then be operated on and applied to the printing mechanism for printing out the characters stored in the data register in terms of a 5 × 7 dot matrix. As is fully discussed in the aforementioned copending patent application, seven electrical output signals are applied to drive seven vertically disposed solenoids, each having a needle rod which impacts on carbonless paper. The characters are then formed by 5 columns of the matrix while the paper is being moved past the solenoid needle assembly. This structure is capable of producing the 64 characters selected from the ASCII code. The printer module for the complete data module is interfaced with the system through the central system bus thereby obtaining its power and data function signals as described hereinabove and as is apparent from FIG. 10.

It will not be assumed that the print on/off switch is in the "on" position and the system is in the local mode so that the STROBE* pulse will turn on the 5 volt power switch 83 and the powerclear circuit 83C. As is evident from the above discussion, the operation of the printer will commence with the STROBE* pulse. The switched volts are used to power the integrated circuits of the printer module and to enable the capstan and take-up motor control circuitry associated with the printer mechanism as illustrated in FIG. 10. At this time, it will also be recognized that the data shifted out of the data register 47 of the keyboard module appears on the system bus identified as the data bus and is in the data* condition. Accordingly, after the STROBE* signal has reached its low voltage condition, and the power clear interval has expired, the central clock pulses will appear on the system bus and the 8 data bits appearing on the data bus will be shifted into the 8 bit data register 80 for the printer module; see FIG. 10A. The least significant bit of the 8 bits will be shifted into the data register 80 first as it was the first bit shifted out of the data register 47.

The first transition of the clock pulse will set the enable flip-flop 81 associated with a character timing circuit 82 to allow three functions to be initiated. The inhibit* line is activated in response to the enabling of the flip-flop 81 from the character timing circuit 82 to thereby prevent any subsequent data from being shifted into the register 80 until the present character print cycle has been completed. At this time also the 5-volt power circuit is latched on by means of power switch 83 and will remain in this condition until the enable flip-flop 81 is reset. The control circuit is further defined to allow a preselected time delay interval to time out for the purposes of providing additional delay from the time power is switched on to the module to the time that the print sequence is initiated to allow sufficient time for the capstan motor to advance the paper at the correct speed. This delay is identified as the "print delay" waveform in FIG. 10A. When this time interval has elapsed a dot "one-shot" switch included with the character timing circuit 82 is enabled. This triggering of the dot one-shot 84 is considered to control a minus 12-volt bias generator circuit 85, the character generator "enable" input, the plus 12-volt power switch 86P for the solenoid enable circuits 86 and the shifting of the "1" bit in the scan register 87 to the next column; see FIG. 10A. The bits from the data register 80 are applied to the character generator 88 for providing the seven ASCII bits for actuating the solenoids of the character printing mechanism for printing out the character represented by the seven ASCII bits in five steps. The character generator 88 may be in the form of a "read only" memory so that the particular bits that are to be imprinted in a 5 × 7 matrix will be read out of the memory in a column by column fashion for actuating the solenoid drivers that are necessary for printing out a dot at a particular location and thereby the solenoids for printing out of a character in terms of the 5 × 7 matrix. The scan register 87 is provided for reading out the five columns of the generator 88 sequentially and in a preselected sequence as identified in FIG. 10A by the column signals CA, CB . . . CE.

When the character generator enable line is TRUE then the generator 88 is interrogated for a particular column to read out all the "1's" for that column. The outputs from the generator 88 are coupled to the solenoid enable element 86 that is in turn coupled to the seven solenoid drivers associated with the needle rods for the printer, all as more specifically described in the copending patent application mentioned hereinabove bearing, Ser. No. 104,352. This sequence of enabling the character generator 88 one column at a time and applying power to the solenoid for producing the data is to be repeated for the five columns of any particular character. After the fifth column is interrogated and printed, the enable flip-flop 81 is reset. This resetting of flip-flop 81 allows the power switch 83 to be turned off and disables the printer module. The removal of the 5 volts also disables the motor control circuitry. In the event that a parity error is detected the print operation is essentially the same as described hereinabove. When a parity error is detected by the error flip-flop in the keyboard module the seven outputs from the generator 88 are all overruled with an all "1's" condition. The function is known as a "rub out" character for producing a character which has 35 dots printed out on the paper in the 5 × 7 matrix.

A further feature of the printer logic illustrated in FIG. 10 is that the 6 and 7 bits from the data register 80 are compared for an all "0" or all "1" condition which indicates that the character code cannot be interpreted correctly by the generator 88. This comparison is effected by the comparison element 90 and its output indicating such a condition is applied to an OR circuit 91. The output of the OR circuit 91 is coupled to a solenoid enabling circuit 86 to produce the "rub out" character.

Now referring to FIG. 11, the magnetic tape module that is employed in the system will be described as it may be implemented into the system. It should now be recognized that the magnetic tape module may be employed for both receiving and sending information by means of its data register 100 through the system bus. A magnetic tape module that may be advantageously employed for this purpose is described in a copending application entitled Magnetic Tape Transport bearing Ser. No. 104,351 and assigned to the same assignee as the present application. The latter mentioned copending application describes a cassette magnetic tape recorder that may be utilized with the data terminal T illustrated in FIG. 1. For this purpose the cassette may be simply loaded and unloaded into the data terminal T as is evident from FIG. 1. The disclosure of the magnetic tape transport per se in the latter mentioned copending application is incorporated herein by reference and reference may be had to said application for a more detailed description of the recorder mechanism of the magnetic tape module. At this point it is well to note that the reading and recording on the magnetic tape may be on a single track and such operations are disclosed in the copending application bearing Ser. No. 724,973, now U.S. Pat. No. 3,576,433 and assigned to the same assignee as the present application. Reference may be had to said patent application for a complete disclosure of the reading/recording structures.

The operation of the magnetic tape module from the standpoint of receiving data from the system data bus to be entered into the tape module data register 100 is essentially identical to that described hereinabove for the printer module. This is particularly evident from examining the block diagram of FIG. 11 which generally outlines in block diagram fashion the control aspects for the magnetic tape module. In this respect it will be noted that the STROBE* signal will be applied to the power switch 101 for powering the electronic system associated with the transport for the cassette magnetic tape cartridge. Also as discussed hereinabove the magnetic tape module may be placed in various modes and the modes are signaled by means of the system busses. For this purpose a single mode control bus is illustrated in FIG. 11 with the understanding as implied in the drawing that various modes will be initiated through the operation of the mode selection controls mounted on the data terminal T and as illustrated in FIG. 1. The modes are so identified in FIG. 11 opposite the mode control bus as OFF, PLAYBACK, REWIND, RECORD and PRINT. The mode control switches for the tape module (excluding the print switch) are defined so that only one of the mode selecting switches may be actuated at any one time. The functions of the various modes for controlling the tape module are fairly straight forward. The "playing" of the magnetic tape in the playback mode results in reading or reproducing the information recorded on the magnetic tape into the logical system of FIG. 11 for playing the information on the magnetic tape into the data register 100 for transmission to another of the other modules of the system. The rewind mode is a tape handling mode for transferring the tape stored on the take-up reel to the supply reel of the cassette. The record mode is effective for recording the information stored in the data register 100 that has been received from one of the other modules of the system onto the magnetic tape system by means of the write/read head 102. When the print switch is activated along with the appropriate tape module switch, the printer module will print out the character that is being written onto the magnetic tape or read from the magnetic tape at the same time. The interaction of the printer module and the tape module relative to the mode control switches is such than when the print select switch and the play switches are both actuated the tape module will be controlled to read the data from the tape incrementally. When the print switch is not actuated and the play switch is actuated the tape module will read the data from the magnetic tape continuously.

It will be recognized that with the selection of a particular mode of operation the signal appearing on the corresponding mode control bus will activate the mode control circuit 103 for activating the tape motion control element 104 for controlling the magnetic tape transport elements of the system. These elements are defined in the aforementioned copending patent application bearing Ser. No. 104,351. The mode control switch 103 will also actuate the character timing circuit 105 for shifting the data bits out of the data register 100 and for application to the read/write head 102 for recording the data shifted out of the register 100. The character timing circuit 105 is also coupled to be responsive to the clock pulses from the central bus for initiating the shifting out of the data from the register 100 into the write amplifier and logic control element 106 coupled to control the energization of the windings for the write/read head 102. For this purpose the write amplifier and logic network 106 is coupled to a write logic network 107 which is also responsive to the STROBE* signal for activating the circuit 107. It should also be recognized that the character timing circuit 105 will couple back an inhibit signal or a "busy" signal to the system bus while the data is being processed by the tape module. In this fashion, then, the information appearing on the data bus of the system will be shifted into the data register 100 and will be processed by the logical circuits associated with the cassette recorder for recording the information on the magnetic tape.

The playing back of the information recorded on the magnetic tape may also be implemented for transferring this recorded data to one of the other modules of the system. For this purpose the magnetic tape element may be considered as the data source 13 of a sending unit as described in connection with FIG. 4. This, for example, will allow the information recorded on the magnetic tape to be printed out to determine what information is on the tape or processed in any other desired fashion. The reading back or playing back of the information on the magnetic tape is more or less conventional and is controlled through the mode selector switch "play" for actuating the tape transport mechanism of the cassette as mentioned hereinabove. In the play mode, however, the read logic circuit 108 and the read amplifier and logic circuit 109 are utilized for controlling the character timing circuit 105 for shifting the information derived from the read head 102 through the read amplifier and logic circuit 109 into the data register 100. This information may then be suitably shifted out of the data register 100 onto the data bus of the system.

What is claimed is:

1. A data collection system comprising a data transmitting element having a data source and means for actuating the source for providing data signals therefrom and a local timing signal source coupled to be responsive to the actuation of said source for providing timing signals of a preselected duration for transferring the data from the source, a control element comprising a central timing signal source coupled to be responsive to the timing signals from the data transmitting element for providing central timing signals for a preselected time duration to allow data to be transferred to the other elements of the system for shifting data from the data transmitting element to another element, and a data receiving element having a data register coupled to receive data signals transferred out of the data source for the data transmitting element in response to the reception of the central timing signals and during the duration thereof.

2. A data collection system as defined in claim 1 wherein the control element comprises a central power source switchably connectable to each of the elements of the system and coupled to be responsive to the local timing signal from the data transmitting element for switching the power onto the other elements of the system for the duration of the timing signal.

3. A data collection system as defined in claim 1 wherein the data source comprises a keyboard means for providing binary coded data signals and a data register for temporarily storing the keyboard generated data signals.

4. A data collection system as defined in claim 3 wherein the keyboard means includes at least a single key for generating preselected identification information for identifying the data transmitting element and coupling the identification information to the data register.

5. A data collection system having a plurality of data collection modules, said system comprising;

a system bus means having a plurality of individual buses for coupling preselected signals to all of the data collection modules coupled thereto, the bus means having individual buses for coupling data handling function signals, data signals and timing signals between the modules coupled thereto, a data transmitting module having a source of data signals, means for actuating the source for providing data signals therefrom, a data register for receiving the data signals from the data source, data transmitting means for providing timing signals of a preselected time duration in response to the actuation of the data source, the data transmitting module being coupled to the system bus for receiving signals therefrom and transferring signals thereto, a system control module comprising a central timing signal source, the control module being coupled to the system bus for receiving signals therefrom and transferring singals thereto, said central timing signal source receiving the timing signals from the individual bus coupled to the data transmitting module timing signal source and coupling central timing signals to an individual system bus, and a data receiving module coupled to the system bus for receiving signals therefrom, said receiving module having a data register coupled to receive the data signals from the data register of the data transmitting module, and the central timing signals being coupled to the data registers of the data transmitting and data receiving modules during the time interval of the data transmitting timing signal.

6. A data collection system as defined in claim 5 wherein the control module comprises a central power source connected to individual buses of the system bus means for coupling power signals to the modules, the control module further having a power switch coupled to receive the data transmitting timing signal for switching the central timing signal source to an active state, the data receiving module having a power switch coupled to receive the data transmitting signal and to switchably couple the power buses to the data receiving module for powering same.

7. A data collection system as defined in claim 6 wherein the power source is a battery.

8. A data collection system as defined in claim 7 wherein the data source of the data transmitting module comprises keyboard means having a plurality of keys for generating data signals and means for transferring the data signals to the transmitting data register.

9. A data collection system as defined in claim 8 wherein the keyboard means includes a key actuatable for generating a unique data transmitting identification module signal for initial entry of the identification module signal into the module data register.

10. A data collection system as described in claim 6 wherein the data receiving module includes means for processing and storing the data signals temporarily stored in the data register thereof.

11. A data collection system as defined in claim 10 wherein the means for processing and storing includes magnetic tape storage means.

12. A data collection system as defined in claim 5 wherein the data receiving module further includes means for transmitting data through the individual data register to the other modules coupled to the system bus means.

13. A data collection system as defined in claim 6 wherein the data receiving module further includes a source of data signals, means for actuating the source for providing data signals for transfer to the individual data register, means for providing timing signals of a preselected time duration in response to the actuation of the data source and coupled to the individual bus in common with the timing signals of the data transmitting module for actuating the central timing signal source.

14. A data collection system as defined in claim 7 wherein the battery power source includes means for detecting a low battery condition.

15. A data collection system as defined in claim 14 wherein the detecting means includes latch means switchably operative in response to a low battery condition and signaling means coupled to be responsive to the latch means in an operative condition for signaling a low voltage condition.

16. A data collection system as defined in claim 14 wherein the signaling means comprises an audible alarm.

17. A data collection system as defined in claim 14 wherein the signaling means comprises a visual voltage indicating means.

18. A data collection system comprising a data transmitting element having a data source, means for actuating the source for providing data signals therefrom, a power switch coupled to be responsive to the actuation of the data source for powering the data transmitting element, said element including a local timing signal source coupled to be responsive to the actuation of the data source for providing timing signals of a preselected time duration, a system control element comprising a central power supply and a power switch coupled to be switchably responsive to the timing signals from the data transmitting element and a central timing signal generator activated in response to the switching of the power switch to provide central timing signals for the time duration of the transmitting element signals, and means for receiving and storing data signals from the transmitting element and including a power switch coupled to be responsive to the timing signals from the transmitting element for coupling power to the receiving means, the central timing signals being coupled to the data source and to the receiving means for transferring the data signals from the data source to the receiving means.

19. A data collection system as defined in claim 18 wherein the power supply is a battery.

20. A keyboard system for a data collection system, said keyboard system comprising a keyboard having a plurality of keys adapted for generating electrical signals, a keyboard matrix coupled to the keyboard with the keys arranged in rows and columns, each of the keys being adapted for bridging a connection between a row and a column to thereby signal the operation of the key, means coupled to the matrix for detecting and signaling the operation of a key, counting means for providing a plurality of scanning signals in accordance with the count thereof and responsive to the key detect signal for initiating the counting sequence, the scanning signals from the counting means being applied in a predetermined pattern to the keyboard matrix, means coupled to the matrix for detecting the column of the matrix coupled to the operated key and providing an output signal to the counting means for stopping the counting sequence, the count stored in the counter at the termination of the counting sequence representing the data to be electrically represented by the operated key, a data register, and means for transferring the count data of the counter to the data register.

21. A data collection system comprising a data generating module including a keyboard having a plurality of keys arranged in a preselected matrix for representing individual characters to be entered into the system upon operation of the keys, encoding means for encoding the key closures and providing encoded signals representative thereof in accordance with a preselected binary code, a data register for receiving and storing the encoded signals, a power switch coupled to be responsive to a key for switching power into the module, and a module timing signal source for producing a data transfer signal for a preselected time duration, a control module including a central power source and a central clock pulse generator for producing timing signals at a preselected rate, said module including a system bus means having a plurality of individual data buses for coupling signals to and from the system modules, one of the individual buses coupling the module timing signals to the other modules and to trigger the central clock pulse generator, the individual buses include power transfer buses, central timing signal buses, data buses and system function buses, said data generating module, control module and other modules for the system being operatively coupled to the system bus means, and a data receiving module coupled to be operative from the system bus means and including a power switch coupled to receive the module timing signals for coupling power to the module in response thereto and a data register for receiving the central clock pulses appearing on the individual bus and the data signals appearing on the data bus.

22. A data collection system as defined in claim 21 wherein the data generating module timing signal source includes a counter for receiving the central clock pulses to terminate the module timing signal source after a preselected count to thereby define the preselected time interval.

23. A data collection system as defined in claim 21 wherein the data receiving module includes magnetic storage means for receiving the data signals from the module data register and means for maintaining the module powered after the termination of the module timing signal for the module transferring data onto the data bus.

24. A data collection system as defined in claim 23 including printer module means coupled to be operative from the system bus means and having a power switch coupled to be responsive to the module timing signals for powering the printer means and a data register coupled to receive the signals on the data buses and the clock pulse signal buses, said printer means including means for visibly printing out the data stored in the module data register.

25. A data collection system as defined in claim 23 wherein the central power source is a battery having voltage regulating/protection means coupled thereto.

26. A data collection system as defined in claim 23 wherein the magnetic storage means comprises a magnetic tape cassette recording/playback means.

27. A data collection system as defined in claim 24 wherein the printer means is a strip printer.

28. A data collection system as defined in claim 21 wherein the keyboard includes a header key for generating a preselected header character along with a unique identification character for identifying the data generating module.

29. A data collection system comprising a data generating module including a keyboard having a plurality of keys arranged in a preselected matrix for representing individual characters to be entered into the system upon operation of the keys, encoding means for encoding the key closures and providing encoded signals representative thereof in accordance with a preselected binary code, a data register for receiving and storing the encoded signals, and a module timing signal source for producing a data transfer signal for a preselected time duration, a control module including a central clock pulse generator for producing timing signals at a preselected rate, said module including a system bus means having a plurality of individual data buses for coupling signals to and from the system modules, one of the individual buses coupling the module timing signals to the other modules and to trigger the central clock pulse generator, the individual buses include central timing signal buses, data buses and system function buses, said data generating module, control module and other modules for the system being operatively coupled to the system bus means, and a data receiving module coupled to be operative from the system bus means and including a data register for receiving the central clock pulses appearing on the individual bus and the data signals appearing on the data buses.

30. A data collection system as defined in claim 29 wherein the data generating module timing signal source includes a counter for receiving the central clock pulses to terminate the module timing signal source after a preselected count to thereby define the preselected time interval.

31. A data collection system as defined in claim 29 wherein the data receiving module includes magnetic storage means for receiving the data signals from the module data register and means for maintaining the module powered after the termination of the module timing signal for the module transferring data onto the data bus.

32. A data collection system as defined in claim 31 including printer module means coupled to be operative from the system bus means and having a power switch coupled to be responsive to the module timing signals for powering the printer means and a data register coupled to receive the signals on the data bus and the clock pulse signal buses, said printer means including means for visibly printing out the data stored in the module data register.

33. A data collection system as defined in claim 31 wherein the central power source is a battery having voltage regulating/protection means coupled thereto.

34. A data collection system as defined in claim 32 wherein the printer means is a strip printer.

* * * * *

PO-1050
(5/69)

UNITED STATES PATENT OFFICE

CERTIFICATE OF CORRECTION

Patent No. 3,771,132 Dated November 6, 1973

Inventor(s) MATHIAS L. BIEWER

It is certified that error appears in the above-identified patent and that said Letters Patent are hereby corrected as shown below:

Col. 1, line 44, reads "the gathering data" should read --for gathering data--
Col. 2, line 14, reads "providing signals" should read --providing data signals--
Col. 5, line 33, reads "S in a local" should read --S is a local--
Col. 6, line 23, reads "concept embodiment" should read --concept embodied--

Col. 15, line 1, reads "will not" should read --will now--
Col. 19, line 19 reads "transferring singals" should read --transferring signals--
Col. 19, line 41 reads "transmitting signal" should read --transmitting timing signal--

Signed and sealed this 24th day of December 1974.

(SEAL)
Attest:

McCOY M. GIBSON JR.
Attesting Officer

C. MARSHALL DANN
Commissioner of Patents